US012650781B2

(12) United States Patent
Choi et al.

(10) Patent No.: US 12,650,781 B2
(45) Date of Patent: Jun. 9, 2026

(54) MEMORY DEVICE INCLUDING ONE-TIME PROGRAMMABLE BLOCK AND OPERATION METHOD THEREOF

(71) Applicant: SAMSUNG ELECTRONICS CO., LTD., Suwon-si (KR)

(72) Inventors: Jae-Hoon Choi, Suwon-si (KR); Sang-Wan Nam, Suwon-si (KR); Sangyong Yoon, Suwon-si (KR); Kookhyun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/795,406

(22) Filed: Aug. 6, 2024

(65) Prior Publication Data

US 2025/0036299 A1     Jan. 30, 2025

Related U.S. Application Data

(63) Continuation of application No. 18/052,285, filed on Nov. 3, 2022, now Pat. No. 12,153,812.

(30) Foreign Application Priority Data

Nov. 12, 2021    (KR) ........................ 10-2021-0156057
May 6, 2022      (KR) ........................ 10-2022-0056017

(51) Int. Cl.
*G06F 3/06*              (2006.01)
(52) U.S. Cl.
CPC ............ *G06F 3/064* (2013.01); *G06F 3/0604* (2013.01); *G06F 3/0619* (2013.01); *G06F 3/0679* (2013.01)
(58) Field of Classification Search
CPC ...... G06F 3/064; G06F 3/0604; G06F 3/0619; G06F 3/0679; G06F 2206/1014; G11C 7/1006; G11C 7/1048; G11C 7/1078
See application file for complete search history.

(56) References Cited

U.S. PATENT DOCUMENTS 7,031,188 B2 *    4/2006   Lee ........................ G11C 16/22
                                                              365/201
7,130,209 B2    10/2006   Reggiori et al.
(Continued)

FOREIGN PATENT DOCUMENTS

JP         11-45233        2/1999
JP       2007-122796       5/2007
(Continued)

OTHER PUBLICATIONS

Y. Ma, H. Du and S. Yang, "Independent bad block management for mass storage flash memory arrays," 2015 6th IEEE International Conference on Software Engineering and Service Science (ICSESS), Beijing, China, 2015, pp. 388-391 (Year: 2015).*
(Continued)

*Primary Examiner* — Khoa D Doan
(74) *Attorney, Agent, or Firm* — Morgan, Lewis & Bockius LLP

(57)                    ABSTRACT

A memory package includes a printed circuit board, a first memory device that is stacked on the printed circuit board, and a second memory device stacked on the first memory device. The first memory device includes a first one-time programmable (OTP) block, the second memory device includes a second OTP block different from the first OTP block, and a horizontal distance from one side of the first memory device to the first OTP block is different from a horizontal distance from one side of the second memory device to the second OTP block.

20 Claims, 22 Drawing Sheets

(56) References Cited

U.S. PATENT DOCUMENTS

| | | | | |
|---|---|---|---|---|
| 7,161,380 | B2 | 1/2007 | Hsu | |
| 7,394,689 | B2 | 7/2008 | Ryu | |
| 7,675,776 | B2* | 3/2010 | Allen | G11C 29/76 |
| | | | | 365/185.11 |
| 8,755,230 | B2 | 6/2014 | Shinagawa | |
| 2010/0220517 | A1 | 9/2010 | Okayama | |
| 2011/0222330 | A1 | 9/2011 | Lee et al. | |
| 2011/0252189 | A1* | 10/2011 | Kang | G06F 12/0246 |
| | | | | 711/E12.008 |
| 2016/0259576 | A1* | 9/2016 | Asami | G06F 3/0659 |
| 2016/0335196 | A1* | 11/2016 | Kumar | G06F 3/0673 |
| 2018/0108425 | A1 | 4/2018 | Lee et al. | |
| 2019/0258581 | A1* | 8/2019 | Lee | G06F 3/068 |
| 2021/0141703 | A1 | 5/2021 | Prabhu et al. | |
| 2022/0415402 | A1 | 12/2022 | Masuduzzaman et al. | |
| 2023/0153000 | A1 | 5/2023 | Choi et al. | |

FOREIGN PATENT DOCUMENTS

| | | |
|---|---|---|
| JP | 5549091 | 7/2014 |
| KR | 10-2005-0046520 | 5/2005 |
| KR | 10-2006-0083336 | 7/2006 |
| KR | 10-2012-0061561 | 6/2012 |
| KR | 10-2014-0083242 | 7/2014 |
| KR | 10-2017-0114593 A | 10/2017 |
| KR | 10-2019-0090634 A | 8/2019 |
| KR | 10-2020-0087393 | 7/2020 |

OTHER PUBLICATIONS

Notice of Allowance dated Apr. 24, 2024 in corresponding U.S. Appl. No. 18/052,285.
Office Action mailed Mar. 19, 2026 in corresponding Korean Patent Application 10-2022-0056017 with English machine translation.

* cited by examiner

Figure 7:
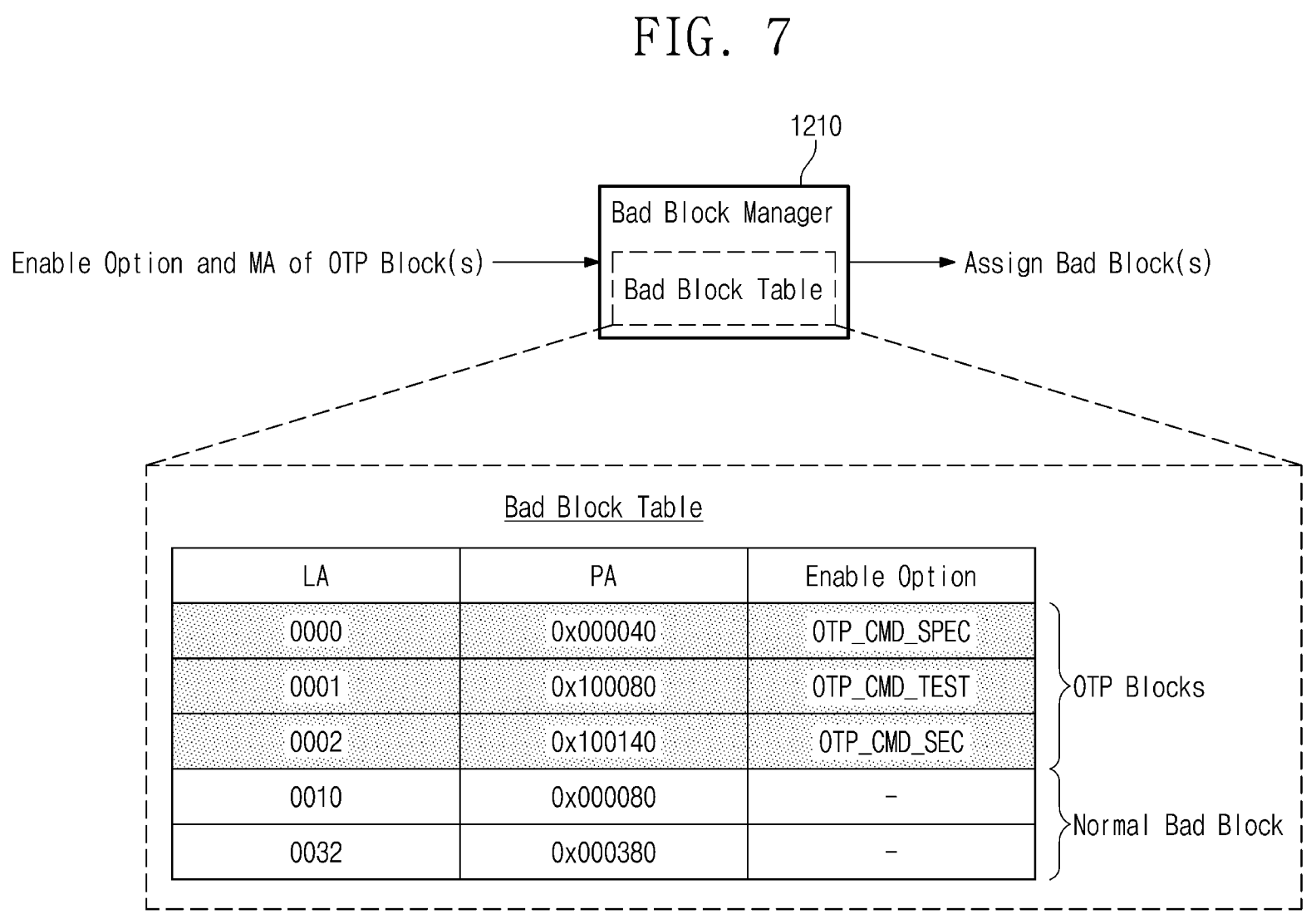

Enable Option and MA of OTP Block(s) →

Bad Block Manager

Bad Block Table

1210

→ Assign Bad Block(s)

Bad Block Table

| LA | PA | Enable Option | |
|------|-----------|---------------|---|
| 0000 | 0x000040 | OTP_CMD_SPEC | OTP Blocks |
| 0001 | 0x100080 | OTP_CMD_TEST | |
| 0002 | 0x100140 | OTP_CMD_SEC | |
| 0010 | 0x000080 | - | Normal Bad Block |
| 0032 | 0x000380 | - | |

FIG. 14A

OTP Mapping Table

| Enable Option | MA(OTP) | | WL# | |
|---|---|---|---|---|
| OTP_CMD_SPEC | User BLK a | OTP Sub BLK 3 | 4~5 | ←——SDATA3 |
| OTP_CMD_TEST | | OTP Sub BLK 2 | 3 | ←——SDATA2 |
| OTP_CMD_SEC | | OTP Sub BLK 1 | 1~2 | ←——SDATA1 |

FIG. 14B

OTP Mapping Table

| Enable Option | MA(OTP) | | SSL# | |
|---|---|---|---|---|
| OTP_CMD_SPEC | User BLK a | OTP Sub BLK 3 | 3 | ←——SDATA3 |
| OTP_CMD_TEST | | OTP Sub BLK 2 | 2 | ←——SDATA2 |
| OTP_CMD_SEC | | OTP Sub BLK 1 | 1 | ←——SDATA1 |

Mapping Table

| LA | ADDR(PA) | Invalid Mark | Enable Option | |
|---|---|---|---|---|
| 0000 | 0x000040 | Invalid | OTP_CMD_SPEC | OTP Blocks |
| 0001 | 0x100080 | Invalid | OTP_CMD_TEST | |
| 0002 | 0x100140 | Invalid | OTP_CMD_SEC | |
| 0003 | 0x001030 | valid | - | User Block |
| 0004 | 0x002010 | valid | - | |
| ... | ... | ... | - | |
| 0010 | 0x000080 | Invalid | - | Normal Bad Block |
| ... | ... | ... | - | |

MEMORY DEVICE INCLUDING ONE-TIME PROGRAMMABLE BLOCK AND OPERATION METHOD THEREOF

CROSS-REFERENCE TO RELATED APPLICATIONS

This U.S. non-provisional patent application is a continuation of U.S. patent application Ser. No. 18/052,285 filed Nov. 3, 2022, which claims priority under 35 U.S.C. § 119 to Korean Patent Application No. 10-2021-0156057 filed on Nov. 12, 2021 and Korean Patent Application No. 10-2022-0056017 filed on May 6, 2022, in the Korean Intellectual Property Office, the disclosures of which are incorporated by reference in their entireties herein.

1. TECHNICAL FIELD

Embodiments of the present disclosure described herein relate to a memory device, and more particularly, relate to a memory device including a one-time programmable (OTP) block.

2. DISCUSSION OF RELATED ART

A memory device may include a plurality of memory blocks. The memory blocks may be classified into user blocks for storing user data, redundancy blocks for replacing a defective user block, an OTP block for storing important data, and an OTP redundancy block for replacing a defective OTP block.

The OTP block is incapable of being changed once programmed. When both an OTP block and an OTP redundancy block fail, the corresponding memory device is considered a defective chip and discarded. Thus, semiconductor yield decreases. A plurality of OTP redundancy blocks may be provided to reduce the chances of the memory device being discarded as a defective chip. However, less storage space is available for users when there is a large number of OTP redundancy blocks.

SUMMARY

Embodiments of the present disclosure provide a memory device capable of efficiently using a data storage device and stably protecting data stored in an OTP block.

According to an embodiment, a memory package includes a printed circuit board, a first memory device that is stacked on the printed circuit board, and a second memory device stacked on the first memory device. The first memory device includes a first one-time programmable (OTP) block, the second memory device includes a second OTP block different from the first OTP block, and a horizontal distance from one side of the first memory device to the first OTP block is different from a horizontal distance from one side of the second memory device to the second OTP block.

According to an embodiment, a memory device includes a memory cell array that includes a plurality of user blocks and at least one one-time programmable (OTP) block, and an address register that stores address information and OTP command information corresponding to the at least one OTP block. The at least one OTP block is randomly disposed in the memory cell array.

According to an embodiment, an operation method of a memory device includes selecting a user block, in which the number of error bits is equal to or less than a reference value, from among a plurality of user blocks of the memory device, assigning the selected user block as one-time programmable (OTP) block, storing data in the OTP block, and storing an OTP address corresponding to the OTP block and an OTP command associated with the OTP address in an address register of the memory device.

BRIEF DESCRIPTION OF THE FIGURES

The above and other objects and features of the present disclosure will become apparent by describing in detail embodiments thereof with reference to the accompanying drawings.

FIG. 1 is a block diagram illustrating a data storage device according to an embodiment of the present disclosure.

FIG. 2 is a block diagram illustrating an example of a memory device of FIG. 1.

FIG. 4 is a block diagram illustrating an example of control logic of FIG. 2.

FIG. 6 is a diagram illustrating an example of an OTP mapping table according to an embodiment of the present disclosure.

FIG. 7 is a diagram illustrating an example of a bad block table according to an embodiment of the present disclosure.

FIG. 14A is a diagram illustrating an example of an OTP mapping table organized when a memory block of FIG. 13 is divided into a plurality of OTP sub-blocks on the basis of a word line.

FIG. 14B is a diagram illustrating an example of an OTP mapping table organized when a memory block of FIG. 13 is divided into a plurality of OTP sub-blocks on the basis of a string selection line.

FIGS. 17 and 18 are diagrams illustrating an example of an updated OTP mapping table and an updated bad block table according to an embodiment of the present disclosure.

FIG. 19 is a block diagram illustrating a data storage device according to an embodiment of the present disclosure.

FIG. 20 is a diagram illustrating an example of a mapping table stored in a working memory of FIG. 19.

DETAILED DESCRIPTION

Figure 3A:
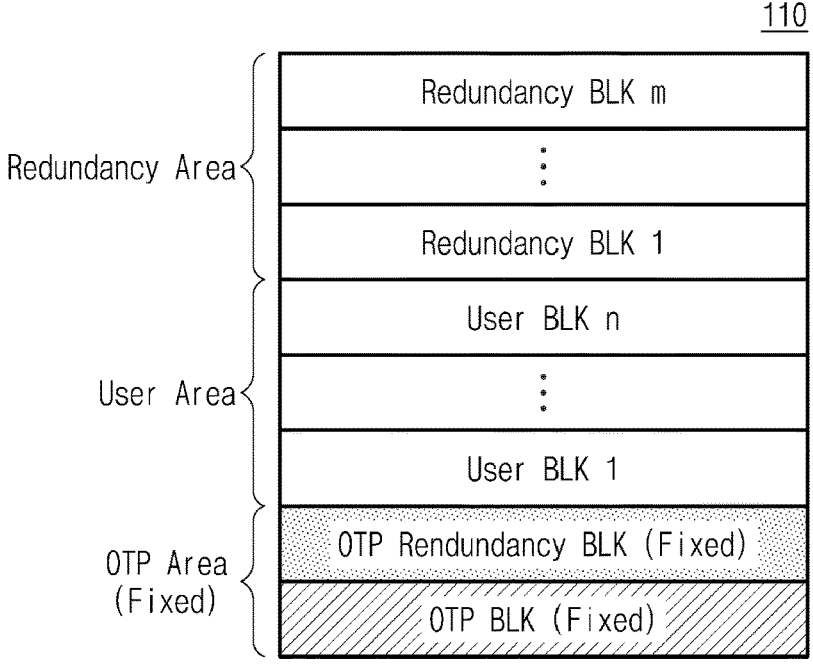
FIG. 3A is a diagram illustrating a memory cell array.

Below, embodiments of the present disclosure will be described in detail and clearly to such an extent that an one of ordinary skill in the art may implement the invention.

Figure 1:
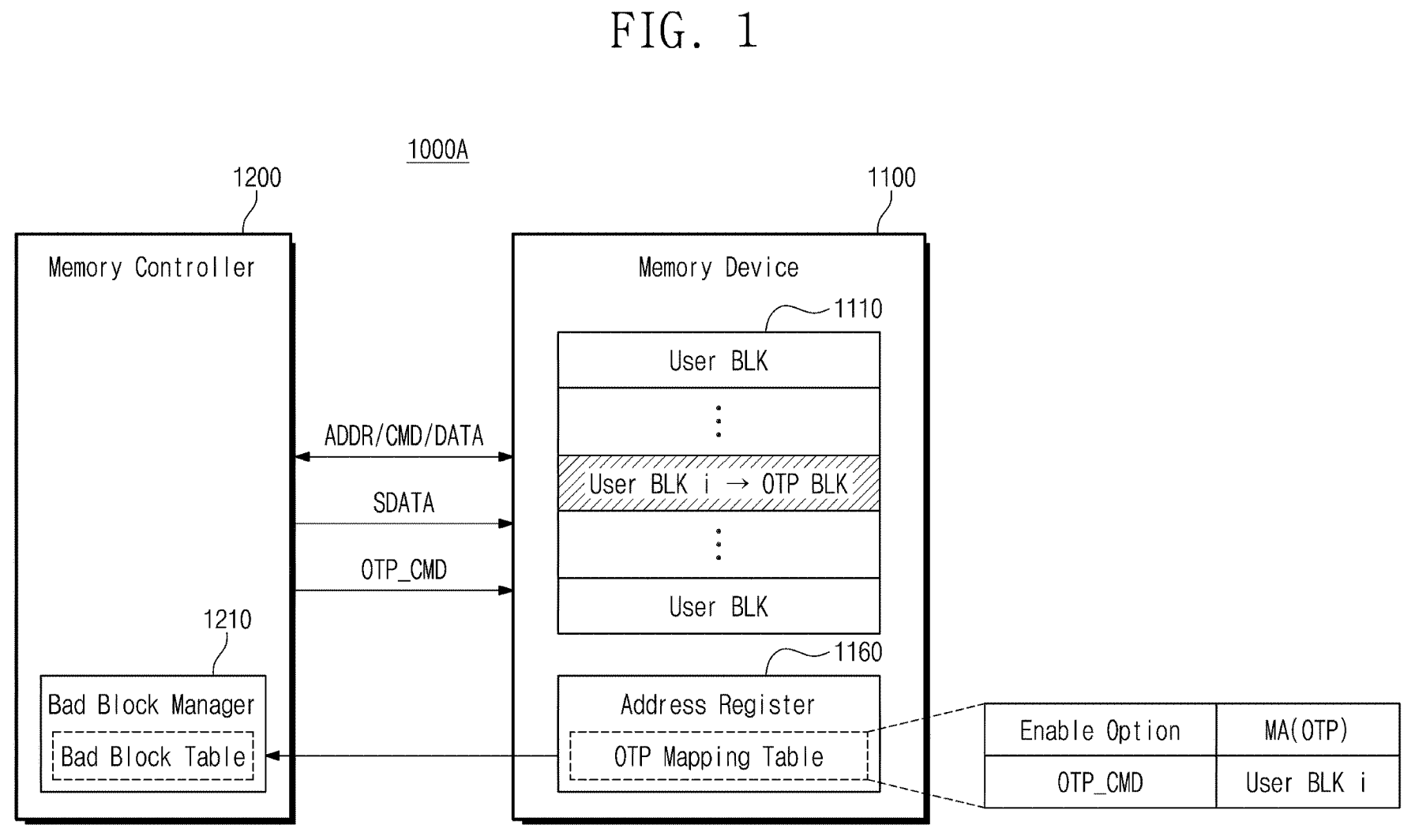

FIG. 1 is a block diagram illustrating a data storage device 1000A according to an embodiment of the present disclosure.

The data storage device 1000A according to an embodiment of the present disclosure selects a user block, from which a defect is absent or in which the number of error bits is equal to or less than a reference value, from among a plurality of user blocks and assigns the selected user block as an OTP block. As such, the data storage device 1000A does not include an OTP redundancy block for coping with the failure of the OTP block and thus may manage a data storage space efficiently.

In addition, the data storage device 1000A according to an embodiment of the present disclosure manages the user block assigned as the OTP block as a bad block. When an erase request, a program request, or a read request not satisfying an enable option is received from a host, the data storage device 1000A may reply, to the host, that a block associated with the request is a bad block. Accordingly, access to the user block assigned as the OTP block may be prevented except for the read request satisfying the enable option. Thus, data stored in the OTP block may be stably protected. For example, if a program request is received having an address of the user block assigned as the OTP block, the data storage device 1000A may notify the host that the user block is a bad block even though the user block is capable of being programmed with data.

Referring to FIG. 1, the data storage device 1000A may include a memory device 1100 and a memory controller 1200.

The memory device 1100 receives an address signal ADDR, a command signal CMD, and user data "DATA" from the memory controller 1200. The memory device 1100 stores the user data "DATA" in user blocks of a memory cell array 1110 based on the address signal ADDR and the command signal CMD.

The memory device 1100 receives special data SDATA from the memory controller 1200. Herein, the special data SDATA may refer to data that is incapable of being changed once stored in the memory device 1100. For example, the special data SDATA may include secure data associated with the memory device 1100, characteristic data obtained as a result of testing the memory device 1100, and/or a product specification of the memory device 1100. However, the present disclosure is not limited thereto. For example, the special data SDATA may refer to the setting data necessary in an operation of the memory device 1100.

The memory device 1100 selects a user block, from which a defect is absent or in which the number of error bits is less than the reference value, from among a plurality of user blocks and assigns the selected user block "User BLK i" as the one-time programmable (OTP) block. The memory device 1100 stores the special data SDATA in the user block assigned as the OTP block.

The memory device 1100 receives an OTP command signal OTP_CMD from the memory controller 1200. Herein, the OTP command signal OTP_CMD may function as an enable option for accessing the OTP block depending on the read request. That is, only when the OTP command signal OTP_CMD is received, the memory device 1100 may access the OTP block to perform the read operation.

Enable option information for accessing the OTP block and address information of the OTP block may be stored in an address register 1160. For example, the address register 1160 may store an OTP mapping table, and an enable option and a memory address MA may be included in the OTP mapping table.

Continuing to refer to FIG. 1, the memory controller 1200 includes a bad block manager 1210 (e.g., a logic circuit). The bad block manager 1210 separately manages the user block assigned as the OTP block as a bad block. To this end, the bad block manager 1210 receives information about the user block assigned as the OTP block from the memory device 1100 and organizes a bad block table by using the received information.

When access to the user block assigned as the OTP block is requested from the host, the memory controller 1200 may operate with reference to the bad block table of the bad block manager 1210.

For example, when the erase or program request for the user block assigned as the OTP block is received from the host or when the read request not satisfying the enable option is received from the host, the memory controller 1200 may reply, to the host, that a block associated with the request is a bad block, with reference to the bad block table.

In another example, when the read request satisfying the enable option is received from the host, the memory controller 1200 may determine that a block corresponding to the read request is the OTP block, with reference to the bad block table, and may transmit the OTP command signal OTP_CMD to the memory device 1100. In this case, the memory device 1100 may access the OTP block corresponding to the OTP command signal OTP_CMD. That is, the memory device 1100 may perform the read operation on the OTP block and may read the special data SDATA stored therein.

As described above, since the data storage device 1000A according to an embodiment of the present disclosure assigns a user block, from which a defect is absent or in which the number of error bits is equal to or less than the reference value, as the OTP block, there is no need to include an OTP redundancy block for coping with failure of the OTP block. Accordingly, the data storage device 1000a may manage a data storage space efficiently. In addition, the data storage device 1000A according to an embodiment of the present disclosure prevents access to the OTP block except for the read request satisfying the enable option. Accordingly, the data stored in the OTP block may be stably protected.

Figure 2:
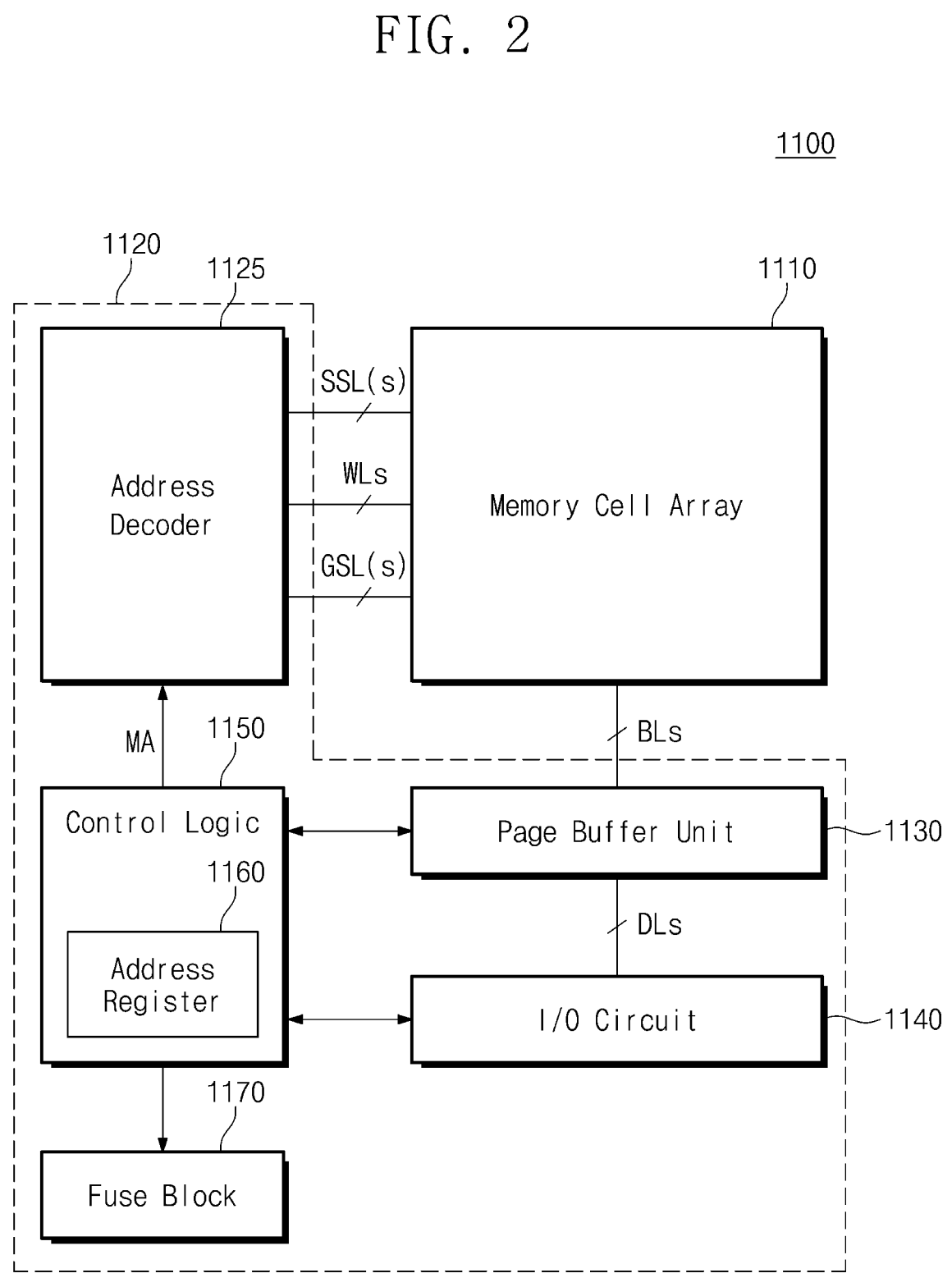

FIG. 2 is a block diagram illustrating an example of the memory device 1100 of FIG. 1. Referring to FIG. 2, the memory device 1100 includes the memory cell array 1110 and a peripheral circuit 1120, and the peripheral circuit 1120 includes an address decoder 1125 (e.g., a decoder circuit), a page buffer circuit 1130, an input/output circuit 1140, control logic 1150, the address register 1160, and a fuse block 1170.

The memory cell array 1110 includes a plurality of memory blocks. Each of the memory blocks may have a two-dimensional structure or a three-dimensional structure. Memory cells of a memory block with the two-dimensional structure (or a planar structure) are formed in a direction parallel to a substrate. However, memory cells of a memory block with the three-dimensional structure (or a horizontal structure) are formed in a direction perpendicular to the substrate.

The memory cell array 1110 may be divided into a user area and a redundancy area. The user area refers to an area assigned to store data program-requested by the user. Accordingly, memory blocks included in the user area may be referred as to "user blocks". The redundancy area refers to an area assigned to replace a user block in which a failure occurs. Accordingly, memory blocks included in the redundancy area may be referred as to "redundancy blocks".

The memory cell array 1110 according to an embodiment of the present disclosure does not include an OTP block assigned at a fixed location. That is, in the memory cell array 1110, the OTP block and the OTP redundancy block are not assigned at fixed locations. Instead of having an OTP block assigned at a fixed location, the memory cell array 1110 according to an embodiment of the present disclosure includes, as the OTP block, a memory block, from which a defect is absent or in which the number of error bits is equal to or less than a reference value, from among the memory blocks assigned as the user area. As such, the OTP block according to an embodiment of the present disclosure may be randomly disposed in the user area.

The address decoder 1125 is connected with the memory cell array 1110 through selection lines SSL and GSL or word lines WLs. The address decoder 1125 may select one of the plurality of memory blocks in response to the memory address MA. Also, the address decoder 1125 may select one of the word lines WLs of the selected memory block.

The page buffer circuit 1130 is connected with the memory cell array 1110 through bit lines BLs. The page buffer circuit 1130 may temporarily store data to be programed at a selected page or data read therefrom.

The input/output circuit 1140 may be connected with the page buffer circuit 1130 through data lines DLs internally, and may be connected with the memory controller 1200 (refer to FIG. 1) through input/output lines externally. The input/output circuit 1140 may receive data to be programmed in a selected memory cell(s) of the memory cell array 1110 in the program operation and may provide the memory controller 1200 with data read from the selected memory cell(s) in the read operation.

The control logic 1150 controls an overall operation of the memory device 1100 in response to a command CMD and an address ADDR provided from the memory controller 1200. The control logic 1150 may include the address register 1160.

The address register 1160 stores enable option information for accessing the OTP block and address information of the OTP block. The address register 1160 includes the OTP mapping table, and information about the enable option and the memory address MA may be stored in the OTP mapping table.

For example, it is assumed that the OTP command signal OTP_CMD is a command signal satisfying the enable option. When the address register 1160 receives the OTP command signal OTP_CMD, the address register 1160 outputs the memory address MA corresponding to the OTP block based on the OTP mapping table. The memory address MA may be provided to the address decoder 1125, and thus, the OTP block of the memory cell array 1110 may be selected. Afterwards, a read operation for reading special data stored in the OTP block may be performed.

The fuse block 1170 may be connected with the page buffer circuit 1130. The fuse block 1170 may be used to process the data stored in the OTP block of the memory cell array 1110 in an electrical fuse (E-Fuse) manner. To this end, the fuse block 1170 may include at least one latch and at least one switch.

For example, when the read operation for the special data stored in the OTP block is performed, the data stored in the OTP block may be stored in the latch of the fuse block 1170 through the page buffer circuit 1130. Afterwards, the special data stored in the latch may be output to the outside (e.g., to the memory controller 1200) through an on/off control of a corresponding switch of switches included in the fuse block 1170.

Figure 3B:
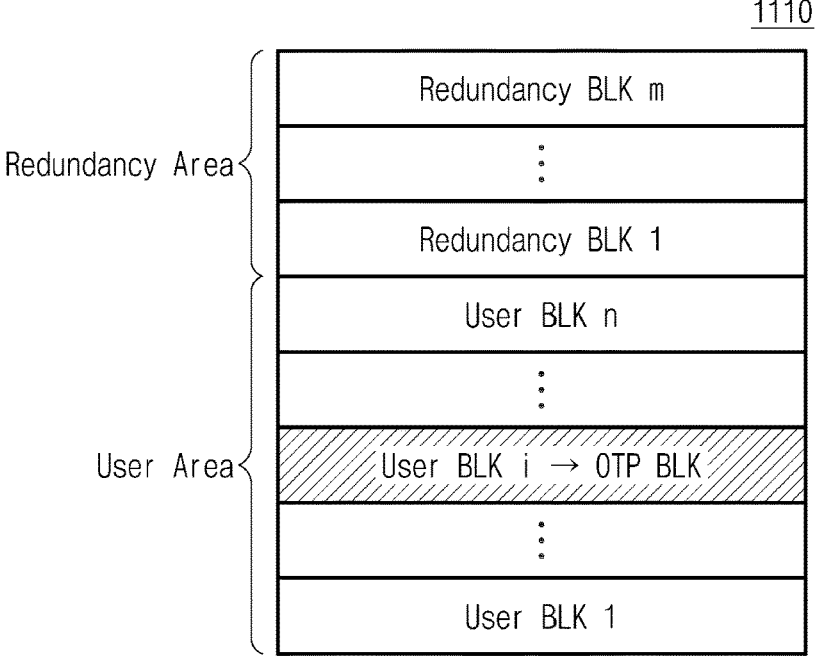
FIG. 3B is a diagram illustrating an example of a memory cell array of FIG. 2.

FIG. 3 illustrates diagrams for describing the memory cell array 1110 of FIG. 2 in detail. In detail, FIG. 3A is a diagram illustrating a memory cell array 110 according to a comparative embodiment, and FIG. 3B is a diagram illustrating an example of the memory cell array 1110 of FIG. 2. For convenience of description, it is assumed that each of the memory cell arrays 110 and 1110 includes one OTP block for which one memory block is assigned.

Referring to FIG. 3A, the memory cell array 110 includes a user area, a redundancy area, and an OTP area. The user area includes a plurality of user blocks User BLK 1 to User BLK n, the redundancy block includes a plurality of redundancy blocks Redundancy BLK 1 to Redundancy BLK m, and the OTP area includes an OTP block OTP BLK and an OTP redundancy block OTP Redundancy BLK.

As illustrated in FIG. 3A, the memory device assigns an area having a specific location of the memory cell array 110 as the OTP area. That is, memory blocks located at the specific area of the memory cell array 110 are assigned as the OTP block and the OTP redundancy block. That is, the locations of the OTP block and the OTP redundancy block are fixed to specific locations of the memory cell array 110.

In the memory device of FIG. 3A, when both the OTP block and the OTP redundancy block for replacing the OTP block fail, the memory device is considered to be a defective chip and is discarded. Thus, a decrease in semiconductor yield occurs.

Referring to FIG. 3B, the memory cell array 1110 according to an embodiment of the present disclosure includes a user area and a redundancy area but does not separately include an OTP area assigned at a fixed location. Instead of the OTP block assigned at a fixed location, the memory cell array 1110 according to an embodiment of the present disclosure includes, as the OTP block, an arbitrary memory block, from which a defect is absent or in which the number of error bits is equal to or less than a reference value, from among the memory blocks assigned as the user area. As such, the OTP block may be randomly placed in the user area.

Also, because an arbitrary block among user blocks from which a defect is absent or in which the number of error bits is equal to or less than a reference value is assigned as the OTP block, the probability that a failure of an OTP block occurs in the memory cell array 1110 according to an embodiment of the present disclosure during a product test is low. In addition, when a failure of the OTP block is determined during the product test or when there is the probability that a failure of the OTP block has occurred during the use of the product, the memory cell array 1110 according to an embodiment of the present disclosure may be implemented such that a user block, from which a defect is absent or in which the number of error bits is equal to or less than the reference value, from among the user blocks is again assigned as the OTP block. For example, once the assigned OTP block is determined to have a defect, a new user block can be assigned to be the OTP block. Accordingly, the memory cell array 1110 according to an embodiment of the present disclosure does not need to include an OTP redundancy block unlike the memory cell array 110. As a result, the storage space of the memory cell array 1110 may be efficiently used, and semiconductor yield may also be improved.

Figure 4:
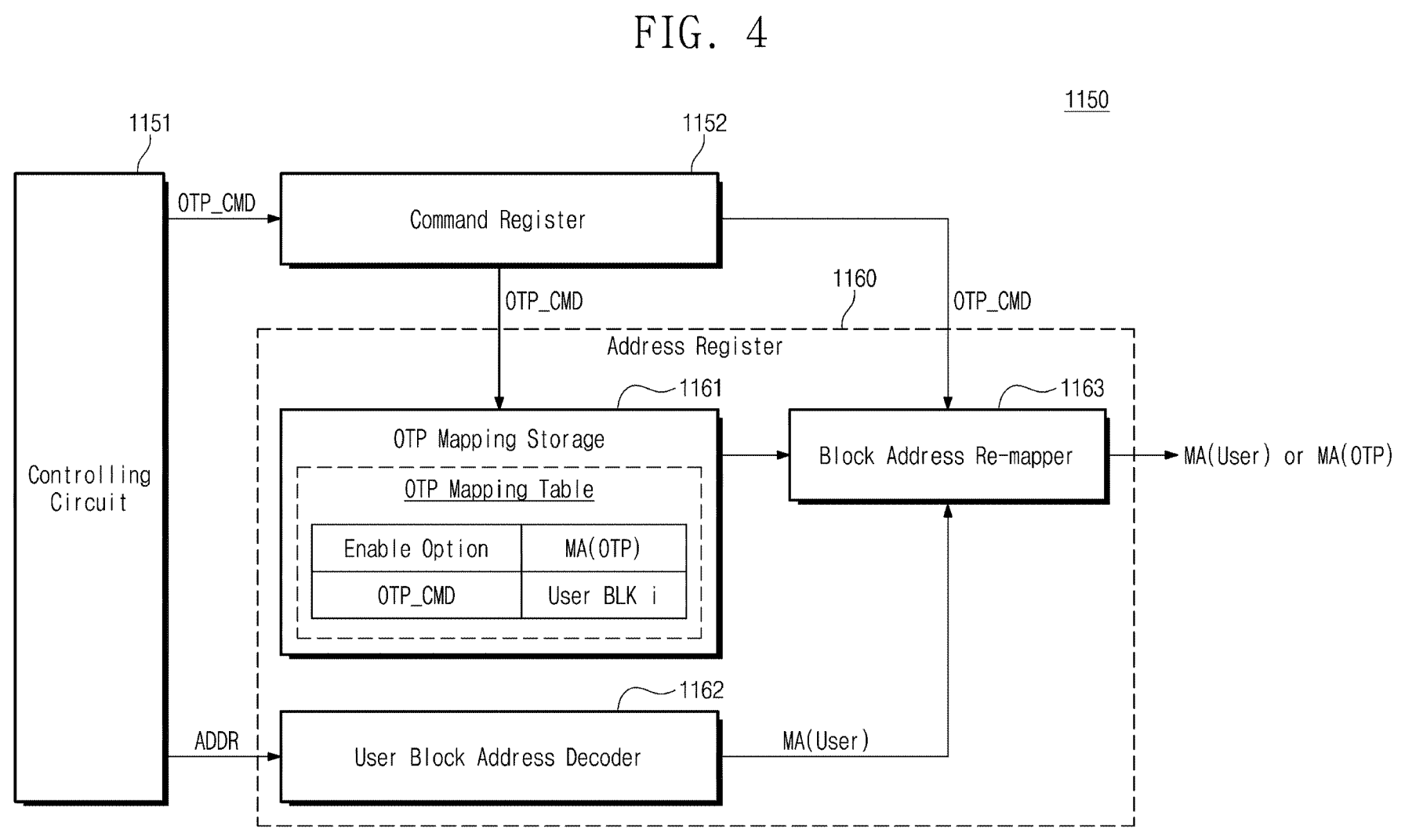

FIG. 4 is a block diagram illustrating an example of the control logic 1150 of FIG. 2.

Referring to FIG. 4, the control logic 1150 may include a controlling circuit 1151, a command register 1152, and the address register 1160.

The controlling circuit 1151 controls an overall operation of the control logic 1150. The controlling circuit 1151 receives the OTP command signal OTP_CMD and the address ADDR from the memory controller 1200 (refer to FIG. 1). The controlling circuit 1151 transmits the OTP command signal OTP_CMD to the command register 1152 and transmits the address ADDR to the address register 1160.

The command register 1152 stores the OTP command signal OTP_CMD received from the controlling circuit 1151. The command register 1152 transfers the OTP command signal OTP_CMD to the address register 1160.

The address register 1160 includes OTP mapping storage 1161, a user block address decoder 1162 (e.g., a logic circuit), and a block address re-mapper 1163 (e.g., a logic circuit).

The OTP mapping storage 1161 stores the OTP command signal OTP_CMD being the enable option information for accessing the OTP block and stores the memory address MA being an address of the OTP block corresponding to the OTP command signal OTP_CMD. For example, an entry of the OTP mapping storage 1161 may include the enable option information and the memory address MA associated with an OTP block. The OTP mapping storage 1161 organizes the OTP mapping table by using the OTP command signal OTP_CMD and the memory address MA.

The user block address decoder 1162 decodes the address ADDR to the memory address MA corresponding to the user block. For example, when the program operation, the read operation, or the erase operation is requested, the user block address decoder 1162 may receive a corresponding address ADDR and may decode the address ADDR so as to be output as the memory address MA corresponding to the user block. The user block address decoder 1162 provides the memory address MA of the user block to the block address re-mapper 1163.

The block address re-mapper 1163 receives the OTP command signal OTP_CMD from the command register 1152 and receives the memory address MA corresponding to the user block from the user block address decoder 1162. Depending on whether the OTP command signal OTP_CMD being the enable option is received, the block address re-mapper 1163 may output the memory address MA corresponding to the user block or may output the memory address MA corresponding to the OTP block.

For example, when the OTP command signal OTP_CMD is received, the block address re-mapper 1163 may refer to the OTP mapping table. When the OTP command signal OTP_CMD coincides with a signal managed in the OTP mapping table, the block address re-mapper 1163 may output the memory address MA of the OTP block corresponding to the OTP command signal OTP_CMD.

For example, when the OTP command signal OTP_CMD is not received, the block address re-mapper 1163 does not refer to the OTP mapping table. In this case, the block address re-mapper 1163 may output the memory address MA of the user block received from the user block address decoder 1162.

Meanwhile, information that is managed in the OTP mapping table of the OTP mapping storage 1161 may be provided to the memory controller 1200 (refer to FIG. 1). The bad block manager 1210 (refer to FIG. 1) of the memory controller 1200 may organize the bad block table by using the enable option information and memory address information about the user block assigned as the OTP block. As such, the user block assigned as the OTP block may be separately managed as a bad block.

As described above, the data storage device 1000A according to an embodiment of the present disclosure selects a user block, from which a defect is absent or in which the number of error bits is equal to or less than the reference value, from among the plurality of user blocks and assigns the selected user block as the OTP block. As such, the data storage device 1000A does not include an OTP redundancy block for coping with a failure of the OTP block and thus may manage a data storage space efficiently. In addition, the data storage device 1000A according to an embodiment of the present disclosure may prevent access to the user block assigned as the OTP block except for the read request satisfying the enable option, and thus, the data stored in the OTP block may be stably protected.

Below, how the data storage device 1000A according to an embodiment of the present disclosure assigns the OTP block and processes an erase request, a program request, and a read request will be described in detail.

Assignment of OPT Block

Figure 5:
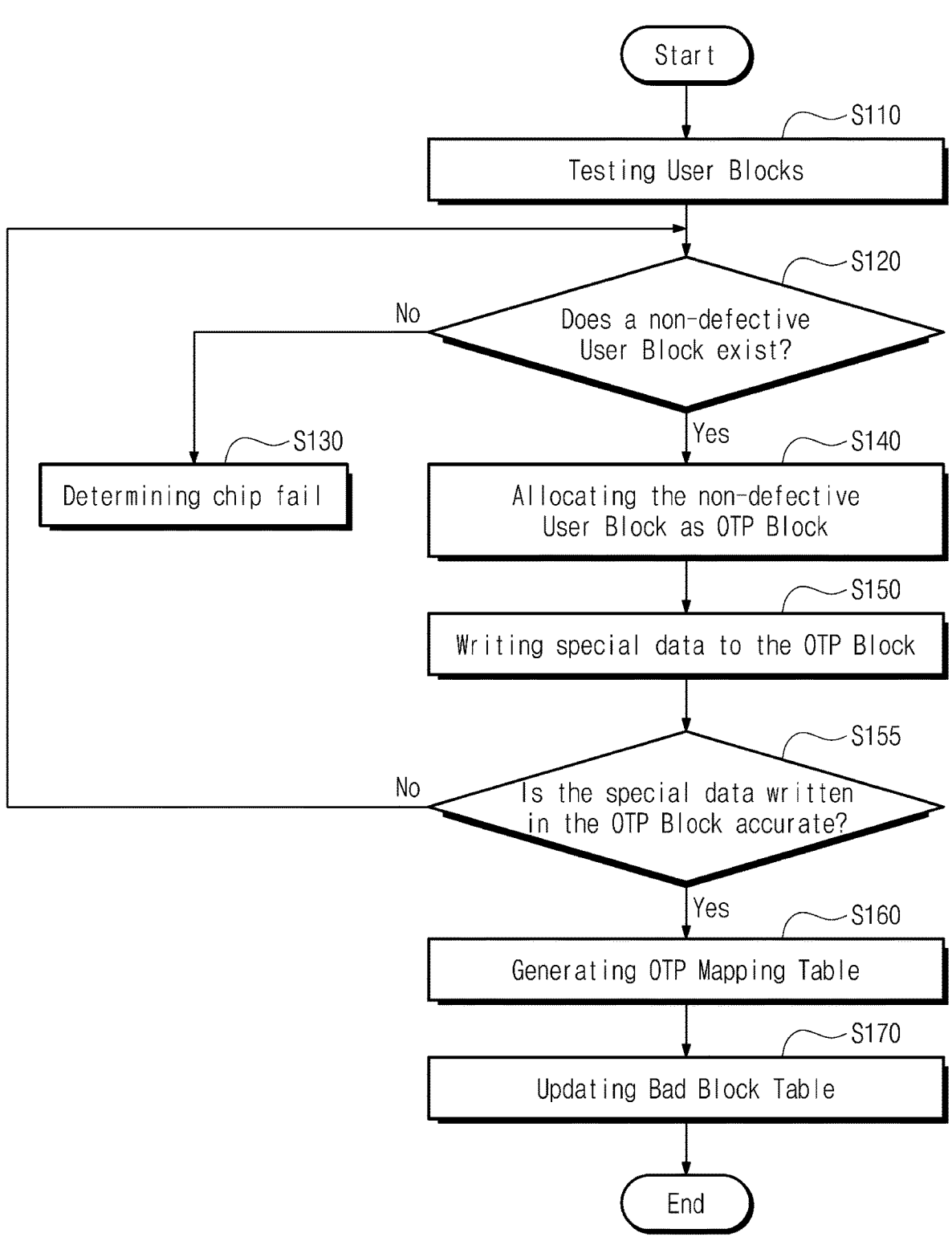
FIG. 5 is a flowchart illustrating an example of an OTP block assignment operation of a data storage device of FIG. 1 according to an embodiment of the present disclosure.

FIG. 5 is a flowchart illustrating an example of an OTP block assignment operation of a data storage device of FIG. 1 according to an embodiment.

In operation S110, a test operation is performed on the user blocks of the memory cell array 1110.

In operation S120, whether a defect-free block is present in the user blocks of the memory cell array 1110 is determined.

When it is determined that all the user blocks are defective, the memory device 1100 is determined to be a chip fail (S130). For example, if all the user blocks are defective, the memory device 1100 may be considered to be a defective chip. In this case, the memory device 1100 may be regarded as a defective product.

When it is determined that non-defective blocks are present in the user blocks, an arbitrary block of the non-defective blocks is selected, and the selected block is assigned as the OTP block (S140).

In operation S150, special data is stored in the block assigned as the OTP block. In an embodiment, the special data may be stored in the OTP block in the form of E-Fuse.

In operation S155, a verify read operation is performed to determine whether the special data is written in the OTP block accurately without errors.

When it is determined that the special data is not accurately written in the OTP block, the process proceeds to operation S120 in which it is determined whether another non-defective user block exists.

When it is determined that the special data is accurately written in the OTP block, the OTP mapping table is generated by using the enable option information and the memory address information corresponding to the OTP block (S160). The OTP mapping table thus generated may be stored in the address register 1160.

Afterwards, the enable option information and the memory address information corresponding to the OTP block are transmitted to the memory controller 1200, and the memory controller 1200 updates the bad block table (S170). That is, the memory controller 1200 may treat and manage the OTP block as a bad block together with any other bad blocks.

Meanwhile, in FIG. 5, the description is given as the non-defective user block is assigned as the OTP block. However, the present disclosure is not limited thereto. For example, a user block in which the number of error bits is equal to or less than the reference value may be assigned as the OTP block.

Figure 6:
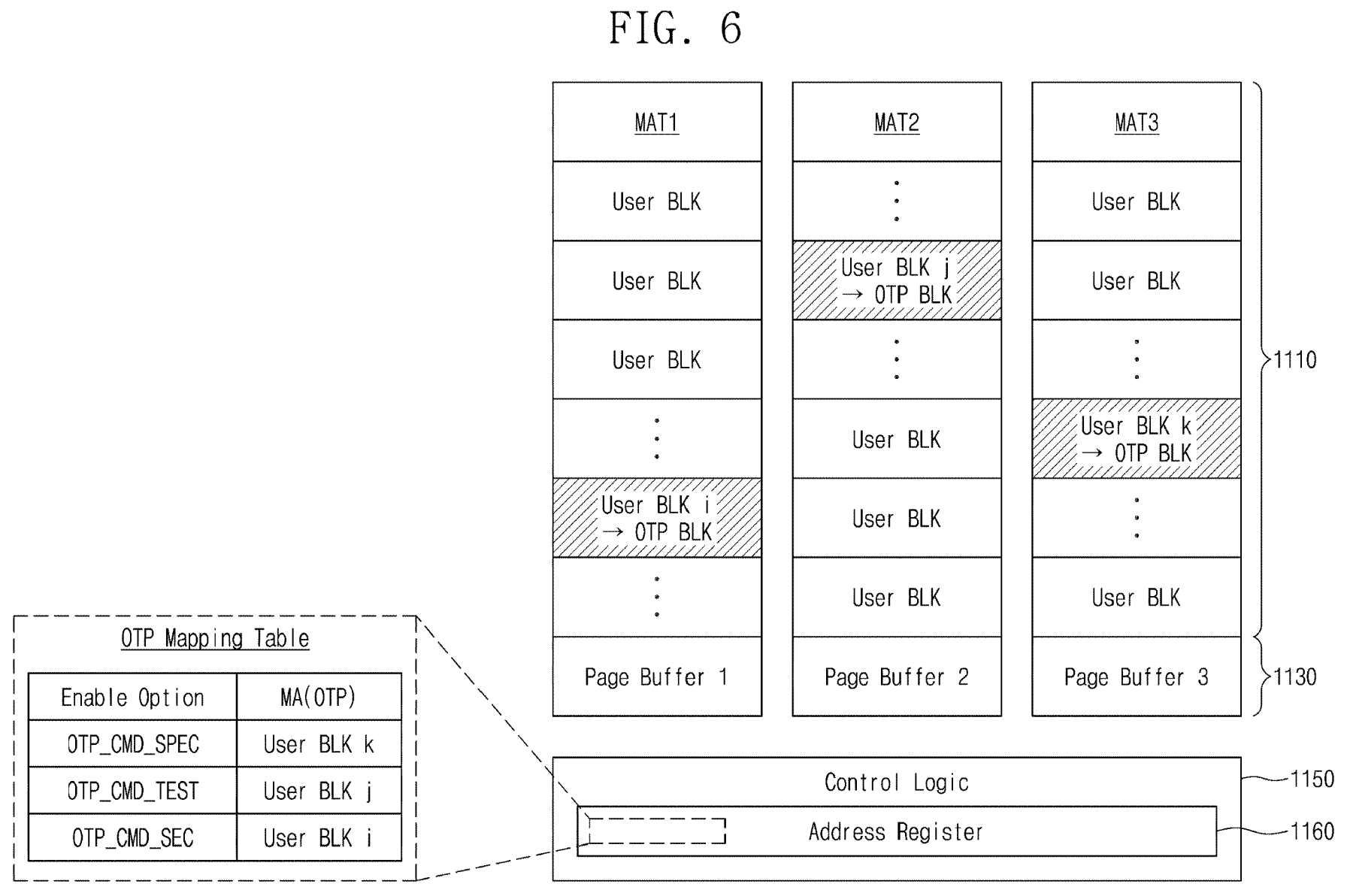

FIG. 6 is a diagram illustrating an example of an OTP mapping table according to an embodiment of the present disclosure. For convenience of description, in FIG. 6, it is assumed that the memory cell array 1110 includes first to third mats MAT1 to MAT3 and one user block is assigned as the OTP block for each mat.

Referring to FIG. 6, in the first mat MAT1, an i-th user block User BLK i is determined to be a non-defective block and is assigned as the OTP block. In the second mat MAT2, a j-th user block User BLK j is determined to be a non-defective block and is assigned as the OTP block. In the third mat MAT3, a k-th user block User BLK k is determined to be a non-defective block and is assigned as the OTP block. Because an arbitrary user block of non-defective user blocks is assigned as the OTP block, as illustrated in FIG. 6, the OTP blocks may be randomly placed in the memory cell array 1110.

Memory address information of the user block assigned as the OTP block and enable option information for accessing the OTP block are stored in the address register 1160 in the form of a mapping table.

For example, the special data may include secure data, characteristic data obtained as a test result, and product specification data. It is assumed that the secure data is stored in the OTP block of the i-th user block User BLK i, the characteristic data is stored in the OTP block of the j-th user block User BLK j, and the product specification data is stored in the OTP block of the k-th user block User BLK k.

Also, it is assumed that the enable option for accessing the OTP block of the i-th user block User BLK i is a secure OTP command signal OTP_CMD_SEC, the enable option for accessing the OTP block of the j-th user block User BLK j is a test OTP command signal OTP_CMD_TEST, and the enable option for accessing the OTP block of the k-th user block User BLK k is a specification OTP command signal OTP_CMD_SPEC.

In this case, as illustrated in FIG. 6, the address register 1160 may organize the OTP mapping table such that the OTP command signals OTP_CMD_SEC, OTP_CMD_TEST, and OTP_CMD_SPEC are included as the enable option and the memory addresses User BLK i, USER BLK j, and User BLK k respectively corresponding to the OTP command signals OTP_CMD_SEC, OTP_CMD_TEST, and OTP_CMD_SPEC are included.

FIG. 7 is a diagram illustrating an example of a bad block table according to an embodiment of the present disclosure. For convenience of description, in FIG. 7, it is assumed that the OTP blocks are assigned as described with reference to FIG. 6.

Referring to FIG. 7, the bad block manager 1210 (e.g., a logic circuit) may receive enable option information and memory address information about blocks assigned as OTP blocks and may organize a bad block table by using the received information.

For example, it is assumed that a logical address LA of the OTP block in which the enable option is the secure OTP command signal OTP_CMD_SEC is "0000", a logical address LA of the OTP block in which the enable option is the test OTP command signal OTP_CMD_TEST is "0001", and a logical address LA of the OTP block in which the enable option is the specification OTP command signal OTP_CMD_SPEC is "0002".

In this case, as illustrated in FIG. 7, the bad block manager 1210 may organize the bad block table such that each enable option and the logical address LA and a physical address PA corresponding thereto are included therein.

Also, the bad block manager 1210 may manage normal bad blocks together, in addition to the blocks assigned as the OTP blocks. Herein, the normal bad block may refer to a block in which the number of error bits exceeds the reference value. For example, it is assumed that blocks whose logical addresses LA are "0010" and "0032" are normal bad blocks. In this case, as illustrated in FIG. 7, the bad block manager 1210 stores information about the logical address LA and the physical address PA of the normal bad block in the bad block table, and information about an enable option is not separately stored therein. Accordingly, the bad block manager 1210 may distinguish the normal bad block and the block assigned as the OTP block through the bad block table. For example, if an entry in the bad block table does not include information about an enable option, that entry may correspond to a normal bad block.

Meanwhile, in FIG. 7, the description is given as the physical address PA is stored in the bad block table. However, the present disclosure is not limited thereto. For example, only information about the logical address LA and the enable option may be stored in the bad block table. For example, a separate mapping table may be present that maps each logical address LA to a corresponding physical address PA.

Also, in FIG. 7, the physical address PA corresponding to a memory block may be the address ADDR that the user block address decoder 1162 of FIG. 4 receives. However, the present disclosure is not limited thereto. For example, the physical address PA may be implemented to be the same as the memory address MA decoded by the user block address decoder 1162.

Erase or Program Request for OTP Block

Figure 8:
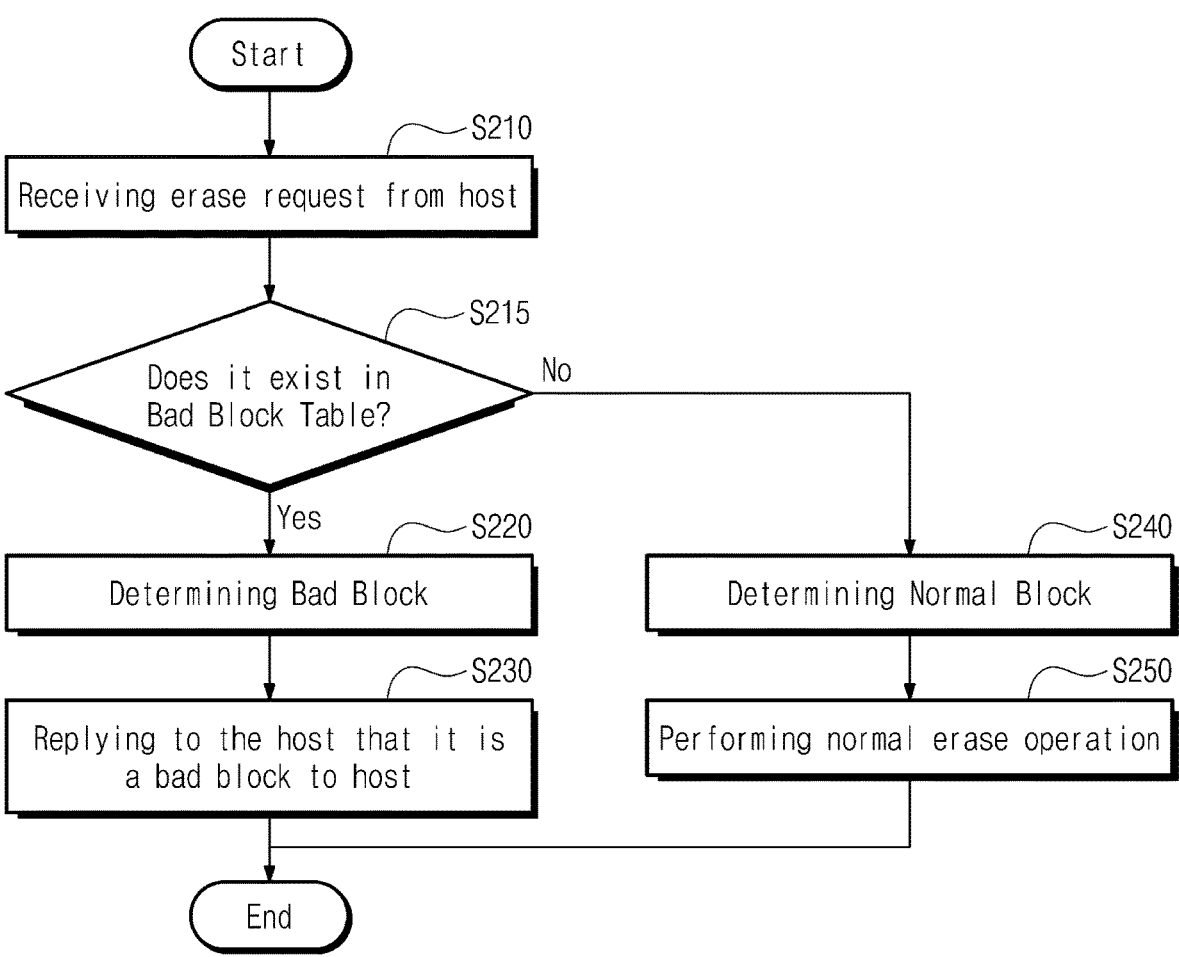
FIG. 8 is a flowchart illustrating an example of an operation of a data storage device of FIG. 1 when an erase request is received from a host.

FIG. 8 is a flowchart illustrating an example of an operation of a data storage device of FIG. 1 when an erase request is received from a host according to an embodiment.

In operation S210, the data storage device 1000A receives the erase request from the host.

In operation S215, the memory controller 1200 determines whether an erase-requested block is a bad block, with reference to the bad block table. For example, the memory controller 1200 may determine whether the erase-requested block is present in the bad block table, by checking the logical address LA of the erase-requested block.

When it is determined that the logical address LA of the erase-requested block is present in the bad block table, the memory controller 1200 determines the erase-requested block to be a bad block (S220). In particular, because the OTP block according to an embodiment of the present disclosure is present in the bad block table, the memory controller 1200 determines the OTP block to be a bad block. In this case, the memory controller 1200 may not transmit an erase request signal to the memory device 1100 and may reply, to the host, that the erase-requested block is a bad block (S230).

When it is determined that the logical address LA of the erase-requested block is absent from the bad block table, the memory controller 1200 determines the erase-requested block to be a normal block (S240). In this case, the memory controller 1200 may transmit the erase request signal to the memory device 1100, and thus, the erase operation may be performed on the erase-requested block (S250).

As described above, when the erase request for the OTP block is received, the memory controller 1200 may determine that the erase-requested block is a bad block and may reply, to the host, that the erase-requested block is a bad block. Accordingly, the access to the OTP block may be prevented, and the special data present in the OTP block may be stably protected. For example, even though the block assigned as the OTP block is not a defective block or has less than a certain number of errors, it is managed as a bad block to prevent it from being erased.

Figure 9:
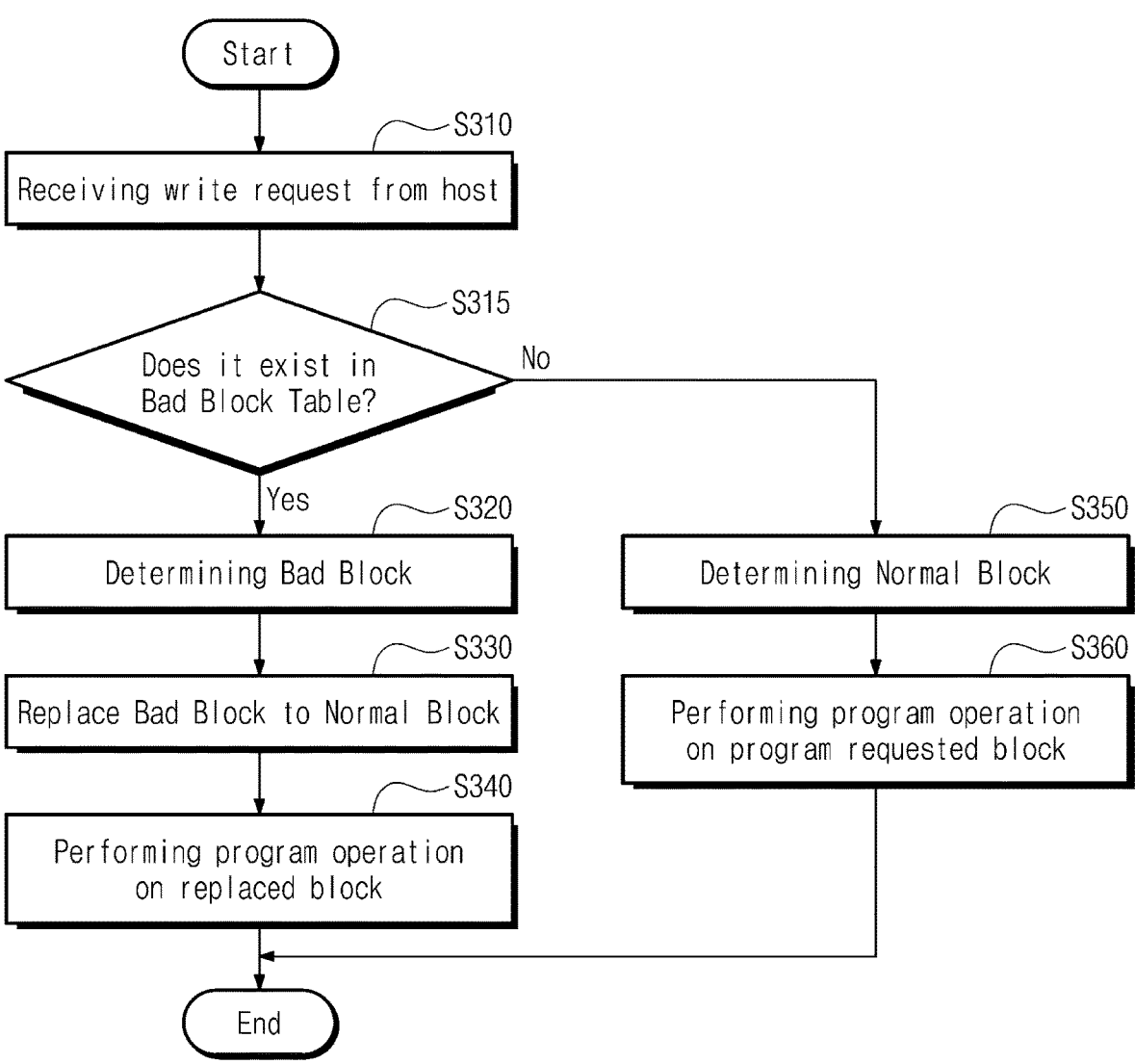
FIG. 9 is a flowchart illustrating an example of an operation of a data storage device of FIG. 1 when a program request is received from a host.

FIG. 9 is a flowchart illustrating an example of an operation of a data storage device of FIG. 1 when a program request is received from a host according to an embodiment.

In operation S310, the data storage device 1000A receives the program request from the host.

In operation S315, the memory controller 1200 determines whether a program-requested block is a bad block, with reference to the bad block table.

When it is determined that the logical address LA of the program-requested block is present in the bad block table, the memory controller 1200 determines the program-requested block to be a bad block (S320). In particular, because the OTP block according to an embodiment of the present disclosure is managed in the bad block table, the memory controller 1200 determines the OTP block to be a bad block.

In this case, the memory controller 1200 replaces the bad block with a normal block (S330). For example, the memory controller 1200 may re-map the logical address LA of the program request to the physical address PA of the user block, based on the mapping table managed in the flash translation layer (FTL). Afterwards, the program operation is performed on the re-mapped user block (S340).

When it is determined that the logical address LA of the program-requested block is absent from the bad block table, the memory controller 1200 determines the program-requested block to be a normal block (S350). In this case, the memory controller 1200 may transmit a program request signal to the memory device 1100, and thus, the program operation may be performed on the program-requested block (S360).

As described above, when the program request for the OTP block is received, the memory controller 1200 may determine that the program-requested block is a bad block and may re-map an address such that the program operation is performed on another user block. Accordingly, the access to the OTP block may be prevented, and the special data present in the OTP block may be stably protected.

Read Request for OTP Block

Figure 10:
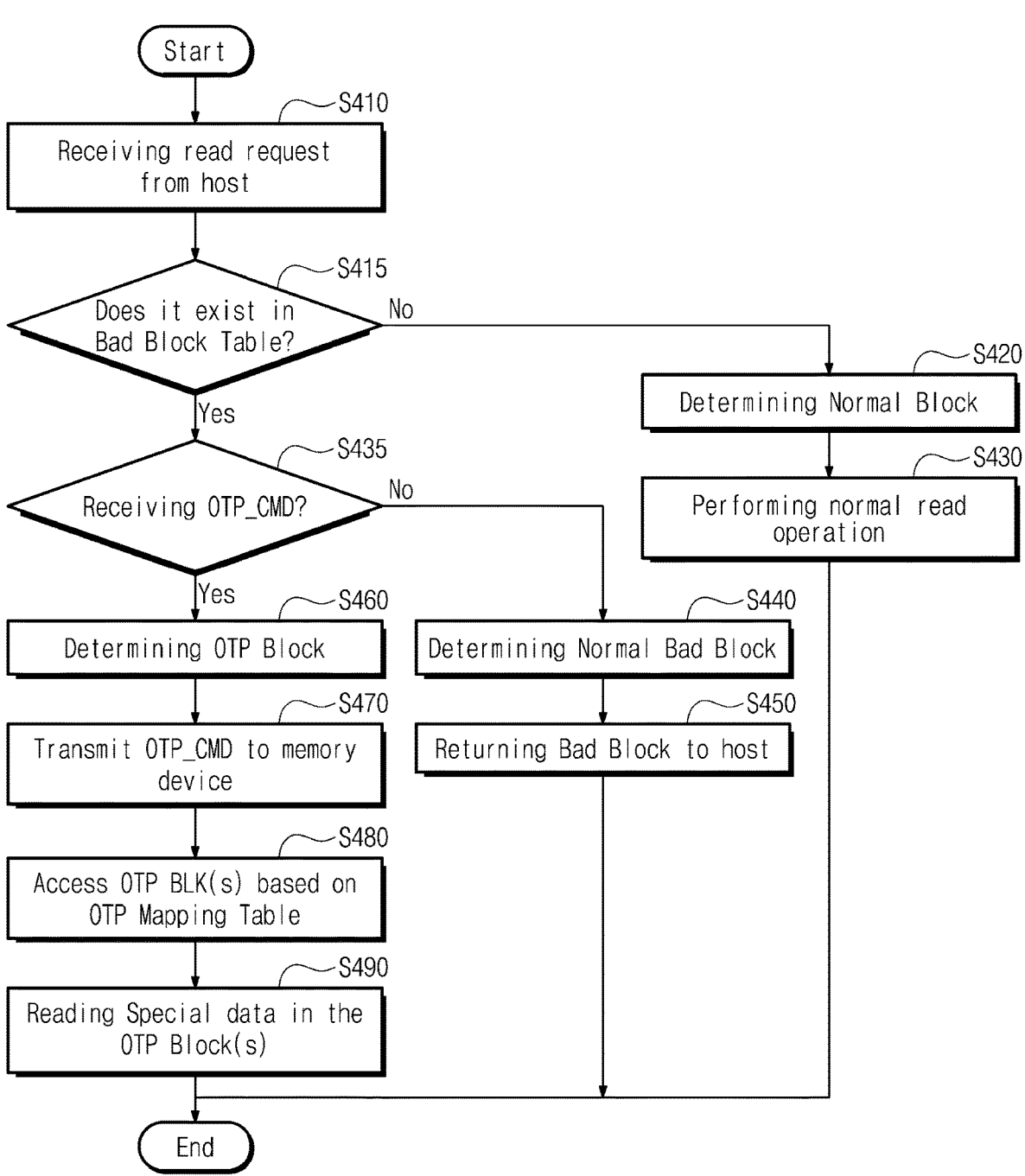
FIG. 10 is a flowchart illustrating an example of an operation of a data storage device of FIG. 1 when a read request is received from a host.

FIG. 10 is a flowchart illustrating an example of an operation of a data storage device of FIG. 1 when a read request is received from a host according to an embodiment. For convenience of description, it is assumed that the OTP mapping table and the bad block table are organized as illustrated in FIGS. 6 and 7.

In operation S410, the data storage device 1000A receives the read request from the host.

In operation S415, the memory controller 1200 determines whether a read-requested block is a bad block, with reference to the bad block table. For example, the memory controller 1200 may determine whether the read-requested block is present in the bad block table, by checking the logical address LA of the read-requested block.

When it is determined that the logical address LA of the read-requested block is absent from the bad block table, the memory controller 1200 determines the read-requested block to be a normal block (S420). In this case, the memory controller 1200 may transmit a read request signal to the memory device 1100, and thus, the read operation may be performed on the read-requested block (S430).

When it is determined that the logical address LA of the read-requested block is present in the bad block table, the memory controller 1200 determines whether a command coinciding with the enable option of the bad block table is received (S435). For example, as illustrated in FIG. 7, the enable option may correspond to the secure OTP command signal OTP_CMD_SEC, the test OTP command signal OTP_CMD_TEST, or the specification OTP command signal OTP_CMD_SPEC.

When it is determined that the command (signal) coinciding with the enable option is not received, the memory controller 1200 determines the read-requested block to be a normal bad block (S440). In this case, the memory controller 1200 may not transmit a read request signal to the memory device 1100 and may notify the host that the read-requested block is a bad block (S450).

When it is determined that the command (signal) coinciding with the enable option is received, the memory controller 1200 determines the read-requested block to be a OTP block (S460). In this case, the memory controller 1200 transmits an OTP command signal coinciding with the enable option to the memory device 1100 (S470). The memory device 1100 checks a memory address of the OTP block corresponding to the OTP command signal with reference to the OTP mapping table and accesses the OTP block (S480). Afterwards, the read operation for the special data present in the OTP block is performed (S490).

As described above, when the read request is received, the memory controller 1200 determines whether the read request is a read request for a normal block or is a read request for a bad block. When the read request is the read request for the bad block, the memory controller 1200 again determines whether the read request is a read request for a normal bad block or is a read request for the OTP block. Only when the read request is the read request for the OTP block, the memory controller 1200 transmits the OTP command signal to the memory device 1100. Accordingly, only when a read request satisfying the enable option is received, the access to the OTP block may be permitted, and thus, the special data present in the OTP block may be stably protected.

Figure 11:
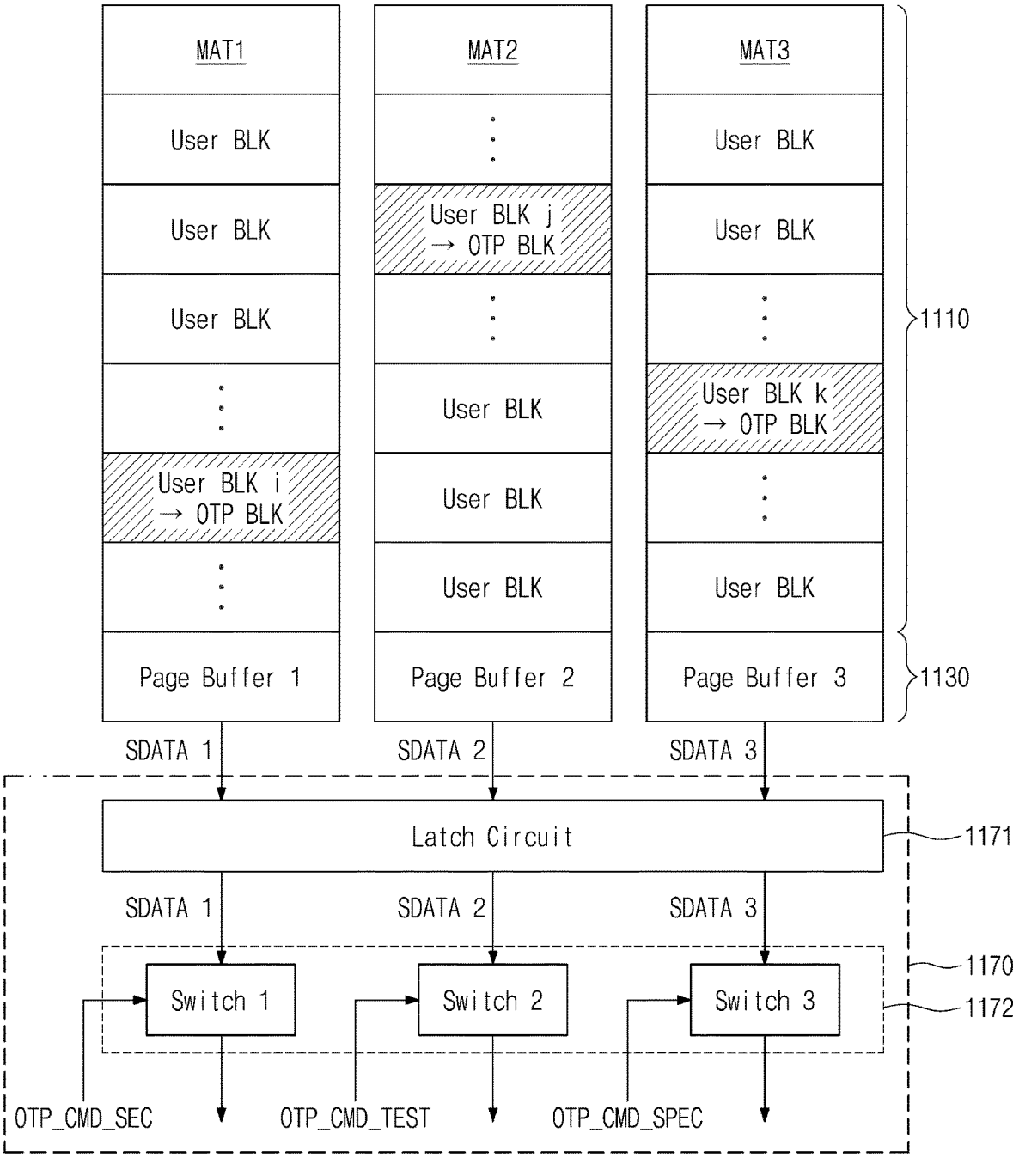
FIG. 11 is a diagram illustrating an example of a read operation for an OTP block according to an embodiment of the present disclosure.

FIG. 11 is a diagram illustrating an example of a read operation for an OTP block according to an embodiment of the present disclosure.

For convenience of description, it is assumed that the memory cell array 1110 includes the first to third mats MAT1 to MAT3 and one OTP block is assigned to each of the first to third mats MAT1 to MAT3 as described with reference to FIG. 6. It is assumed that first to third special data SDATA1 to SDATA3 are respectively stored in the OTP blocks of the first to third mats MAT1 to MAT3. Also, it is assumed that the first special data SDATA1 is secure data, the second special data SDATA2 is characteristic data obtained as a test result, and the third special data SDATA3 is product specification data.

The special data SDATA1 to SDATA3 may be stored in the OTP blocks in the E-Fuse manner. The special data SDATA1 to SDATA3 stored in the E-Fuse manner may be read out through the fuse block 1170 in the read operation. To this end, referring to FIG. 11, the fuse block 1170 may include a latch circuit 1171 and a switch circuit 1172.

The latch circuit 1171 is connected with the memory cell array 1110 through the page buffer circuit 1130. In the read operation for the OTP block, the latch circuit 1171 stores the special data SDATA1 to SDATA3 read from the first to third mats MAT1 to MAT3 through the corresponding page buffers Page Buffer1 to Page Buffer3.

The switch circuit 1172 includes switches Switch1 to Switch3 respectively corresponding to the special data SDATA1 to SDATA3, and each of the switches Switch to Switch3 is turned on in response to the corresponding enable option.

For example, in the read operation, the first switch Switch1 may receive the secure OTP command signal OTP_CMD_SEC from the address register 1160 (refer to FIG. 6) and may output the first special data SDATA1 stored in the latch circuit 1171 to the outside in response to the secure OTP command signal OTP_CMD_SEC. As in the above description, in the read operation, the second and third switches Switch2 and Switch3 may respectively receive the test OTP command signal OTP_CMD_TEST and the specification OTP command signal OTP_CMD_SPEC from the address register 1160 and may respectively output the second special data SDATA2 and the third special data SDATA3 stored in the latch circuit 1171 to the outside in response to the test OTP command signal OTP_CMD_TEST and the specification OTP command signal OTP_CMD_SPEC.

As described above, the special data stored in the OTP block may be stored in the E-Fuse manner. Only when a command signal satisfying the enable option is received, the special data may be output to the outside through the fuse block 1170. Accordingly, the special data stored in the OTP block may be protected more stably.

While the above description is provided based on certain embodiments for carrying out the invention, the present disclosure is not limited thereto. Below, various modified embodiments and application examples according to an embodiment of the present disclosure will be described.

OTP Block Integrally Storing Special Data

Figure 12A:
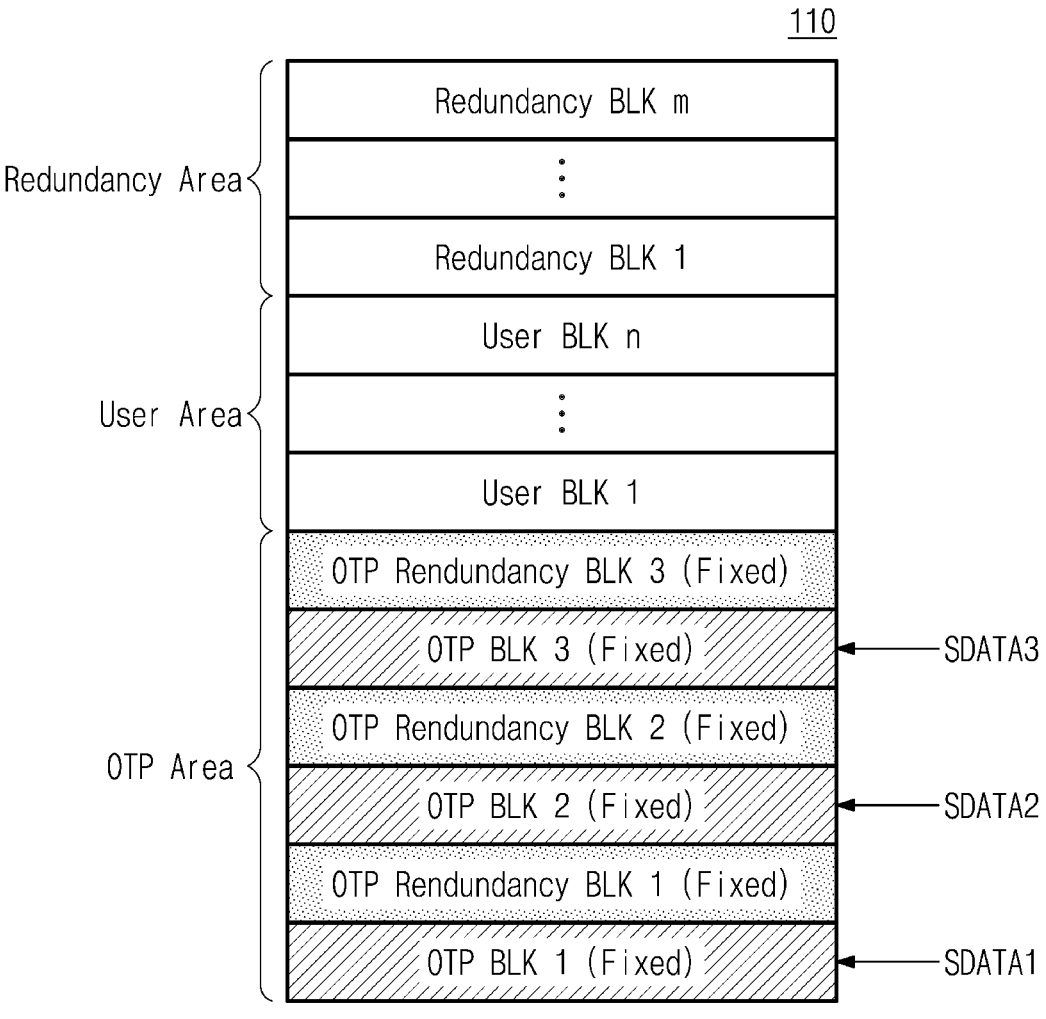
FIG. 12A is a diagram illustrating a memory cell array.
Figure 12B:
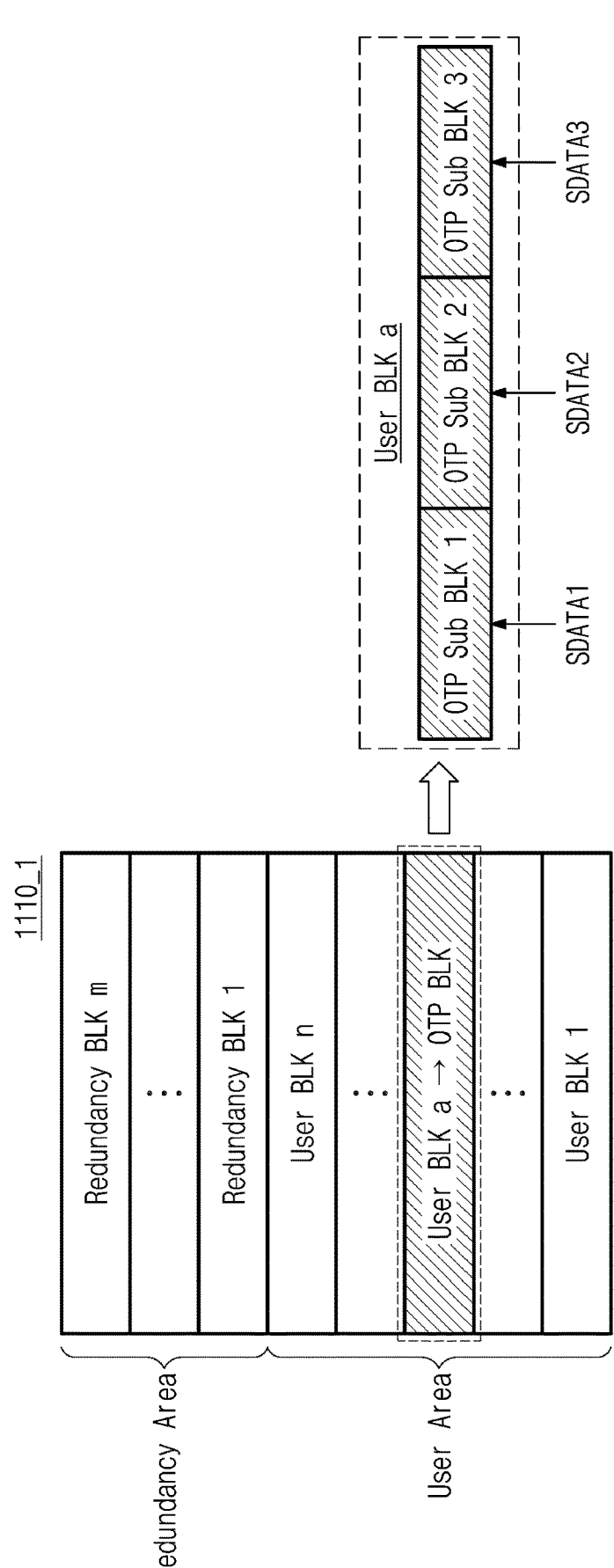
FIG. 12B is a diagram illustrating a memory cell array according to an embodiment of the present disclosure.

FIGS. 12A and 12B illustrate diagrams for describing a memory cell array according to an embodiment of the present disclosure. In detail, FIG. 12A is a diagram illustrating memory cell array 110 according to a comparative embodiment, and FIG. 12B is a diagram illustrating a memory cell array 1110_1 according to an embodiment of the present disclosure. For convenience of description, it is assumed that the first special data SDATA1 is secure data, the second special data SDATA2 is characteristic data obtained as a test result, and the third special data SDATA3 is product specification data. The memory cell arrays 110 and 1110_1 of FIGS. 12A and 12B are similar to those of FIG. 3. Thus, for convenience of description, additional description associated with the similar components will be omitted to avoid redundancy.

As illustrated in FIG. 12A, the memory device independently stores different special data in different OTP blocks of the memory cell array 110. For example, the first special data SDATA1 may be stored in the first OTP block OTP BLK 1;

the second special data SDATA2 may be stored in the second OTP block OTP BLK 2; and the third special data SDATA3 may be stored in the third OTP block OTP BLK 3.

Considering that a storage capacity necessary to store special data is not large, in general, the way to independently store special data in different OTP blocks causes the waste of the data storage space. In particular, considering that the data storage space of a memory block with a three-dimensional structure is significantly large, a significant data storage space may be wasted.

Referring to FIG. 12B, the memory cell array 1110_1 according to an embodiment of the present disclosure integrally stores pieces of special data in at least one OTP block. In detail, in the memory cell array 1110_1, a user block, from which a defect is absent or in which the number of error bits is equal to or less than the reference value, from among the user blocks is assigned as the OTP block, and the OTP block thus assigned is divided into a plurality of OTP sub-blocks. In this case, one OTP block may be divided into the plurality of OTP sub-blocks on the basis of a word line or a string selection line.

For example, one OTP block may be divided into first to third OTP sub-blocks OTP Sub BLK 1 to OTP Sub BLK 3 on the basis of a word line. In this case, the first special data SDATA1 may be stored in the first OTP sub-block OTP Sub BLK 1; the second special data SDATA2 may be stored in the second OTP sub-block OTP Sub BLK 2; and the third special data SDATA3 may be stored in the third OTP sub-block OTP Sub BLK 3.

As described above, the memory cell array 1110_1 according to an embodiment of the present disclosure may integrally store different special data in at least one OTP block. Accordingly, the data storage space may be efficiently used compared to the memory cell array of FIG. 12A.

In addition, the memory cell array 1110_1 according to an embodiment of the present disclosure does not need to include an OTP redundancy block unlike a conventional memory cell array. Accordingly, the storage capacity of the memory cell array 1110_1 may be used more efficiently.

Figure 13:
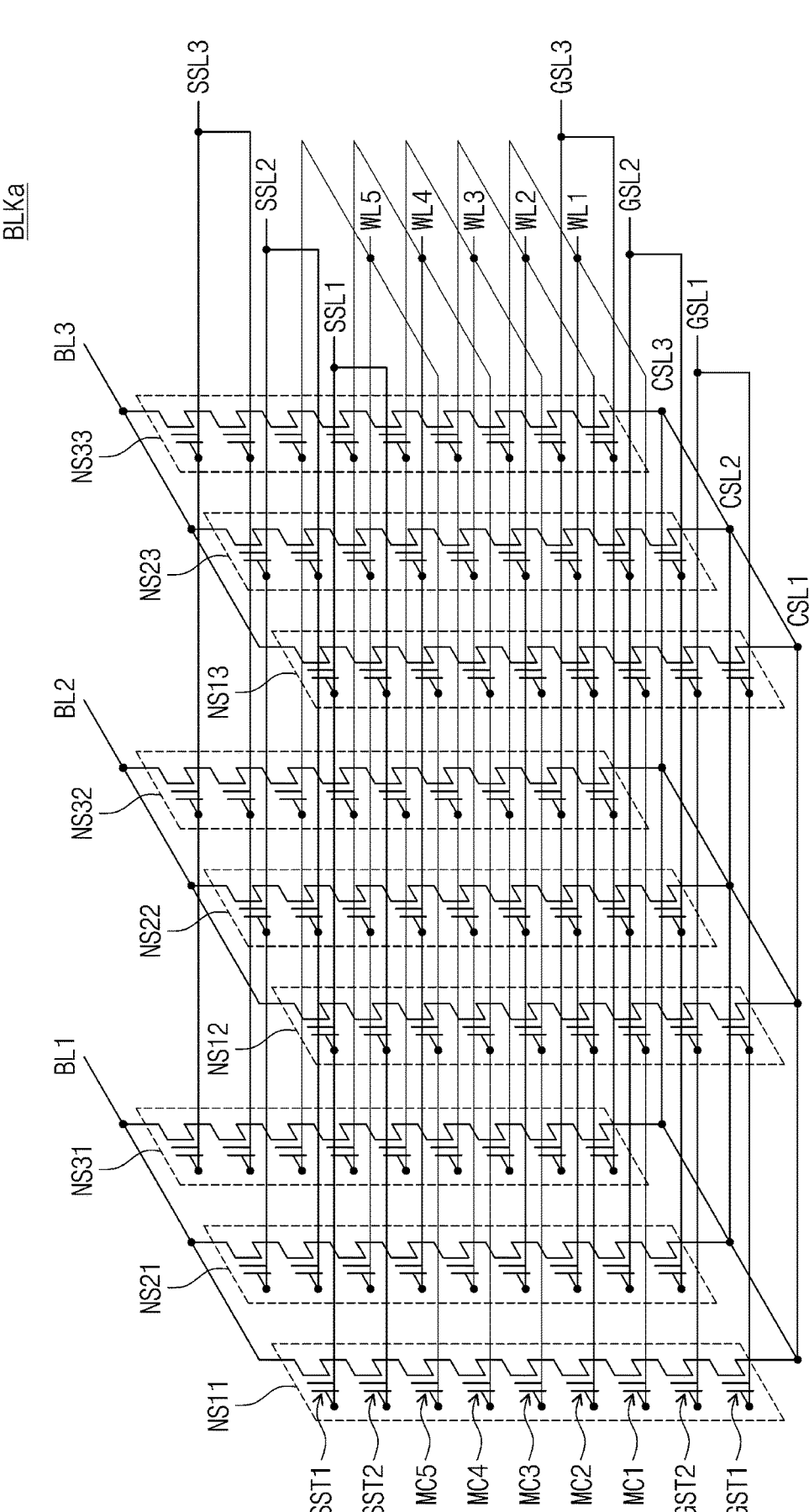
FIG. 13 is a diagram illustrating an example of an OTP block included in a memory cell array of FIG. 12B.

FIG. 13 is a diagram illustrating an example of an OTP block of the memory cell array 1110_1 of FIG. 12B. In an embodiment, a memory block of a three-dimensional structure is illustrated in FIG. 13.

Referring to FIG. 13, a memory block BLKa includes a plurality of NAND strings NS11 to NS13, NS21 to NS23, and NS31 to NS33 with a vertical structure, which are arranged in a matrix. Each of the NAND strings NS11 to NS13, NS21 to NS23, and NS31 to NS33 includes at least a pair of string selection transistors SST1 and SST2, a plurality of memory cells MC1 to MC5, and at least a pair of ground selection transistors GST1 and GST2. Herein, the memory cells MC1 to MC5 are respectively implemented in different layers.

A first bit line BL1 is connected in common with one ends of the NAND strings NS11, NS21, and NS31 arranged at the first column; a second bit line BL2 is connected in common with one ends of the NAND strings NS12, NS22, and NS32 arranged at the second column; a third bit line BL3 is connected in common with one ends of the NAND strings NS13, NS23, and NS33 arranged at the third column.

A common source line CSL1 to CSL3 is connected in common with opposite ends of the NAND strings NS11 to NS13, NS21 to NS23, and NS31 to NS33, which face away from the first to third bit lines BL1, BL2, and BL3.

Each of word lines WL1 to WL5 is connected in common with memory cells arranged in the same layer.

A first string selection line SSL1 is connected in common with the string selection transistors SST1 and SST2 of the NAND strings NS11, NS12, and NS13 arranged at the first row. A second string selection line SSL2 is connected in common with the string selection transistors SST1 and SST2 of the NAND strings NS21, NS22, and NS23 arranged at the second row. A third string selection line SSL3 is connected in common with the string selection transistors SST1 and SST2 of the NAND strings NS31, NS32, and NS33 arranged at the third row.

A first ground selection line GSL1 is connected in common with the ground selection transistors GST1 and GST2 of the NAND strings NS11, NS12, and NS13 arranged at the first row. A second ground selection line GSL2 is connected in common with the ground selection transistors GST1 and GST2 of the NAND strings NS21, NS22, and NS23 arranged at the second row. A third ground selection line GSL3 is connected in common with the ground selection transistors GST1 and GST2 of the NAND strings NS31, NS32, and NS33 arranged at the third row.

In the memory block BLKa, the number of the NAND strings NS11 to NS13, NS21 to NS23, and NS31 to NS33, the number of the word lines WL1 to WL5, and the number of the bit lines BL1 to BL3 are illustrated as an example. In the memory block BLKa of the present disclosure, the number of NAND strings and the number of bit lines are not necessarily limited thereto.

In an embodiment of the present disclosure, the memory block BLKa may be assigned as the OTP block. The memory block BLKa assigned as the OTP block may be divided into a plurality of OTP sub-blocks on the basis of a word line WL or a string selection line SSL.

FIG. 14A is a diagram illustrating an example of an OTP mapping table organized when the memory block BLKa of FIG. 13 is divided into a plurality of OTP sub-blocks on the basis of a word line.

Referring to FIG. 14A, the memory block BLKa may be divided into three OTP sub-blocks on the basis of the word line WL. For example, memory cells connected with the first and second word lines WL1 and WL2 may constitute the first OTP sub-block OTP Sub BLK1; memory cells connected with the third word line WL3 may constitute the second OTP sub-block OTP Sub BLK2; and memory cells connected with the fourth and fifth word lines WL4 and WL5 may constitute the third OTP sub-block OTP Sub BLK3.

The first special data SDATA1 may be stored in the first OTP sub-block OTP Sub BLK1, and the secure OTP command signal OTP_CMD_SEC may be set as the enable option corresponding to the first OTP sub-block OTP Sub BLK1. As in the above description, the second and third special data SDATA2 and SDATA3 may be respectively stored in the second and third OTP sub-blocks OTP Sub BLK2 and OTP Sub BLK3, and the test OTP command signal OTP_CMD_TEST and the specification OTP command signal OTP_CMD_SPEC may be respectively set as the enable options corresponding to the second and third OTP sub-blocks OTP Sub BLK2 and OTP Sub BLK3. As such, the OTP mapping table may be organized as illustrated in FIG. 14A.

FIG. 14B is a diagram illustrating an example of an OTP mapping table organized when the memory block BLKa of FIG. 13 is divided into a plurality of OTP sub-blocks on the basis of a string selection line. The OTP mapping table of FIG. 14B is similar to the OTP mapping table of FIG. 14A.

For convenience of description, additional description associated with the similar components will be omitted to avoid redundancy.

Referring to FIG. 14B, the memory block BLKa may be divided into three OTP sub-blocks on the basis of the string selection line SSL. Different special data may be respectively stored in different OTP sub-blocks, and different enable options may be set to the different OTP sub-blocks. As such, the OTP mapping table may be organized as illustrated in FIG. 14B.

As described above, in the case where a memory block is implemented in the three-dimensional structure, the OTP block according to an embodiment of the present disclosure may be divided into a plurality of OTP sub-blocks on the basis of a word line or a string selection line, and unique memory address and enable option information may be set for each OTP sub-block. Accordingly, different special data may be integrally stored in at least one OTP block. This may mean that the data storage space is efficiently used compared to a conventional memory cell array.

In the case where a memory block is implemented in the two-dimensional structure, the OTP block according to an embodiment of the present disclosure may be divided into a plurality of OTP sub-blocks on the basis of a word line.

Re-Assignment of OTP Block

Figure 15:
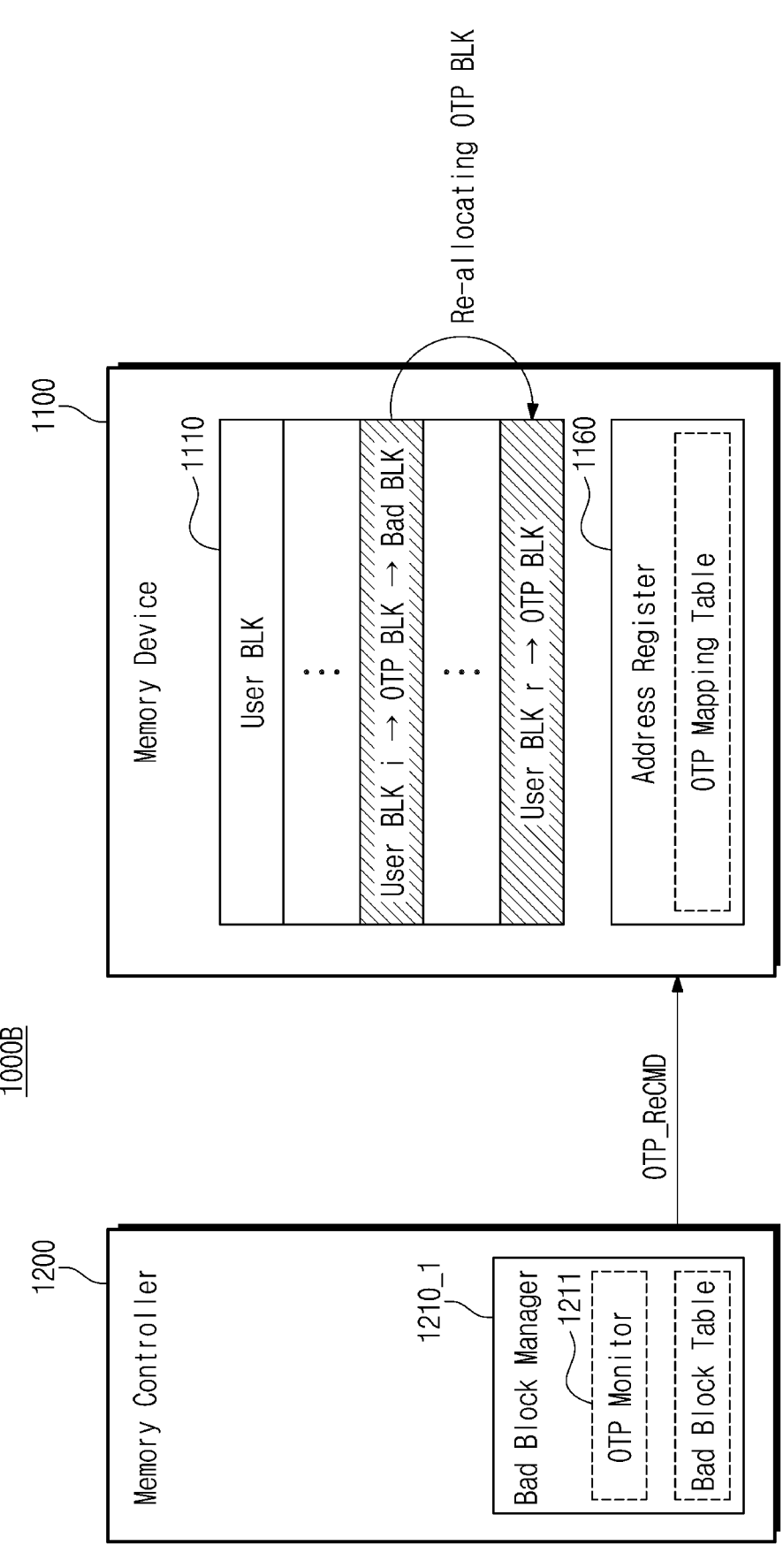
FIG. 15 is a block diagram illustrating a data storage device according to an embodiment of the present disclosure.

FIG. 15 is a block diagram illustrating a data storage device 1000B according to an embodiment of the present disclosure. The data storage device 1000B of FIG. 15 is similar to the data storage device 1000A of FIG. 1. Accordingly, a similar component may be marked using similar reference numerals/signs, and additional description associated with the similar components will be omitted to avoid redundancy.

The data storage device 1000B according to an embodiment of the present disclosure may support a function of re-assigning an old OTP block to another OTP block when there is the probability that a defect will occur in a block assigned as the old OTP block. To this end, a bad block manager 1210 of a memory controller 1200 may further include an OTP monitor 1211 (e.g., a logic circuit).

The OTP monitor 1211 monitors a state of the OTP block of the memory device 1100. For example, the OTP monitor 1211 may count the number of times a read operation is performed on the OTP block. When the number of times the read operation is performed is equal to or greater than a reference value, the OTP monitor 1211 may determine that there is a probability that a defect will or has occurred in the OTP block. For example, the OTP monitor 1211 may determine it is likely that the defect will or has occurred when the number of times the read operation is performed is equal to or greater than a reference value. In another example, the OTP monitor 1211 may monitor a temperature of the OTP block. When the temperature of the OTP block is equal to or higher than a reference temperature, the OTP monitor 1211 may determine that there is a probability that a defect occurs in the OTP block. For example, the OTP monitor 1211 may determine it is likely that the defect will or has occurred when the temperature of the OTP block is equal to or higher than a reference temperature.

When there is a probability that a defect occurs in the OTP block, the memory controller 1200_1 may transmit an OTP re-assignment command signal OTP_ReCMD to the memory device 1100. In response to the OTP re-assignment command signal OTP_ReCMD, the memory device 1100 may again select a user block, from which a defect is absent or in which the number of error bits is equal to or less than the reference value, from among the user blocks and may re-assign the selected user block for a new OTP block. Afterwards, special data may be stored in the new OTP block, and the OTP mapping table and the bad block table may be updated.

As described above, when there is a probability that a defect occurs in the OTP block, the data storage device 1000B according to an embodiment of the present disclosure may re-assign a new OTP block from the user blocks. Accordingly, the special data stored in the OTP block may be protected more stably.

Figure 16:
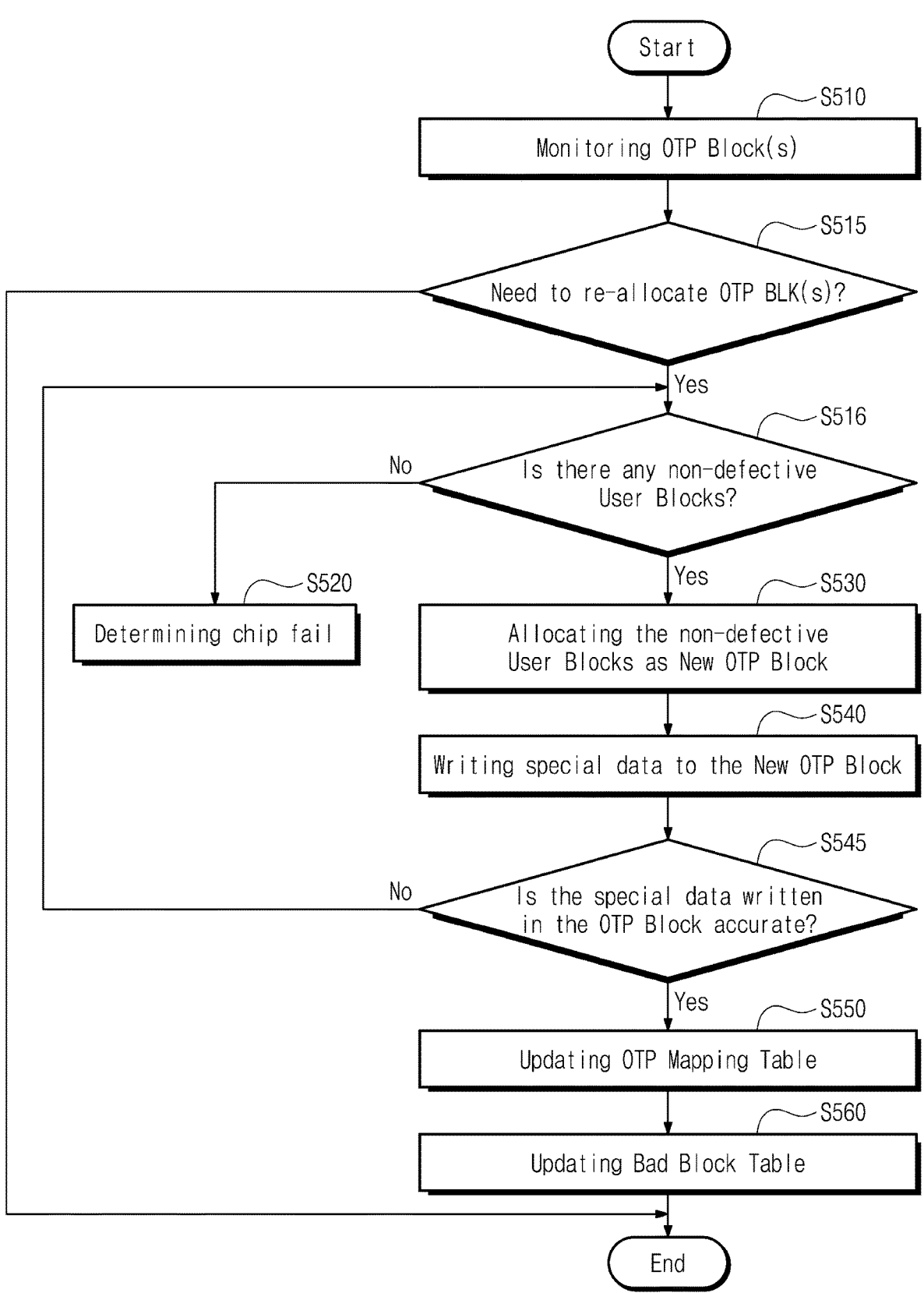
FIG. 16 is a flowchart illustrating an example of an OTP block re-assignment operation of FIG. 15 according to an embodiment of the present disclosure.

FIG. 16 is a flowchart illustrating an example of an OTP block re-assignment operation of FIG. 15 according to an embodiment.

In operation S510, the OTP monitor 1211 of the bad block manager 1210_1 monitors the OTP block.

In operation S515, the bad block manager 1210_1 determines whether there is a need to re-assign the OTP block. For example, the bad block manager 1210_1 may determine whether there is a need to re-assign the OTP block, based on the probability that a defect occurs in the OTP block.

When it is determined that there is a need to re-assign the OTP block, in operation S516, whether a non-defective block is present in the user blocks of the memory cell array 1110 is determined.

When it is determined that all the user blocks are defective, the memory device 1100 is determined to be a chip fail (S520). In this case, the memory device 1100 may be regarded as a defective product.

When it is determined that non-defective blocks are present in the user blocks, an arbitrary block of the non-defective blocks is selected, and the selected block is assigned as a new OTP block (S530).

In operation S540, special data is again stored in the block assigned as the new OTP block. For example, special data present in the old OTP block may be read, and the special data thus read may be again programmed in the new OTP block.

In operation S545, a verify read operation is performed to determine whether the special data is written in the new OTP block accurately without errors.

When it is determined that the special data are not accurately written in the OTP block, the process proceeds to operation S516 in which it is determined whether another non-defective user block exists.

When it is determined that the special data is accurately written in the OTP block, the OTP mapping table is updated by using enable option information and memory address information corresponding to the new OTP block (S550).

Afterwards, the enable option information and the memory address information corresponding to the new OTP block are transmitted to the memory controller 1200_1, and the memory controller 1200_1 updates the bad block table (S560).

Figure 17:
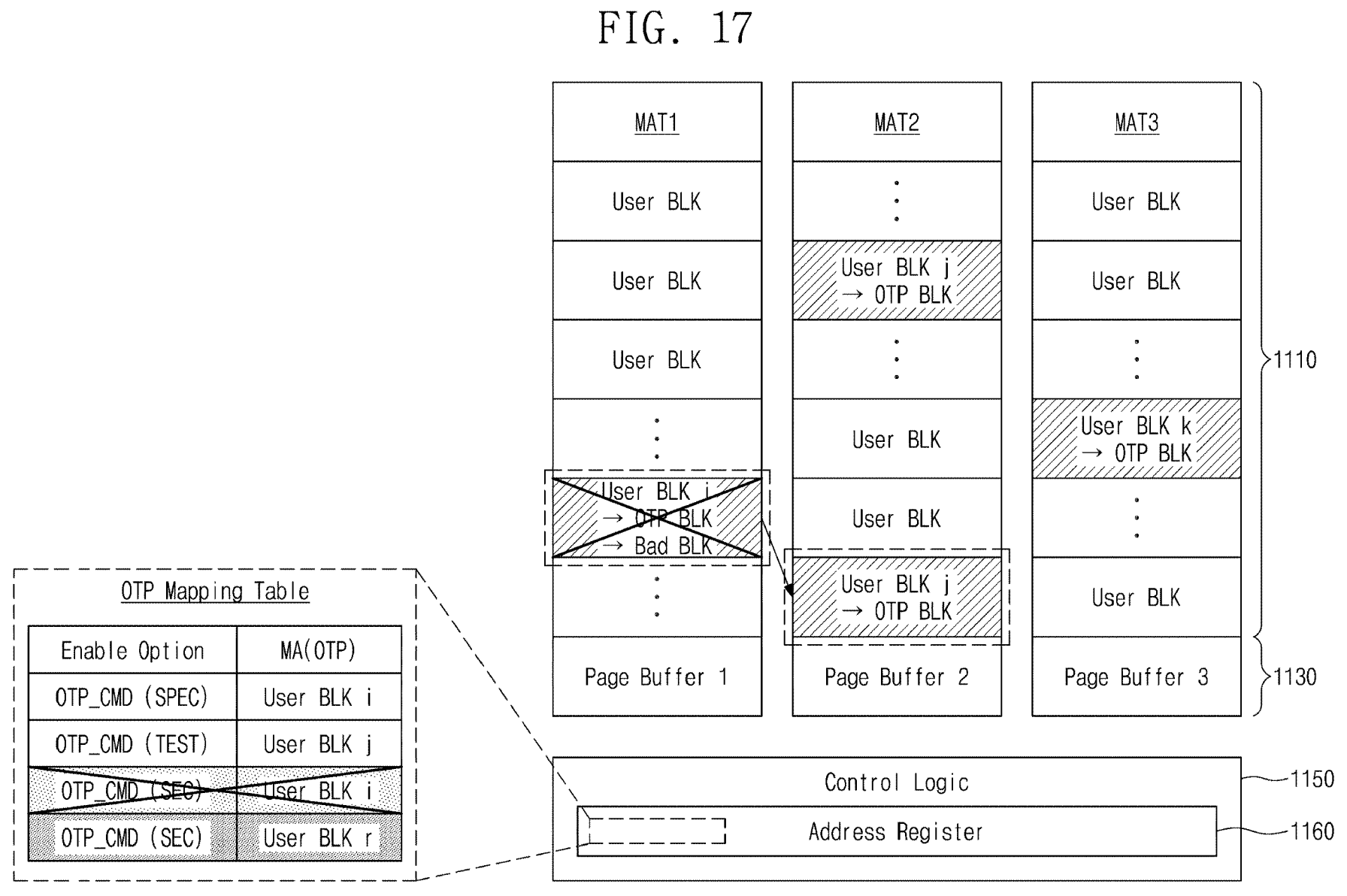
Figure 18:
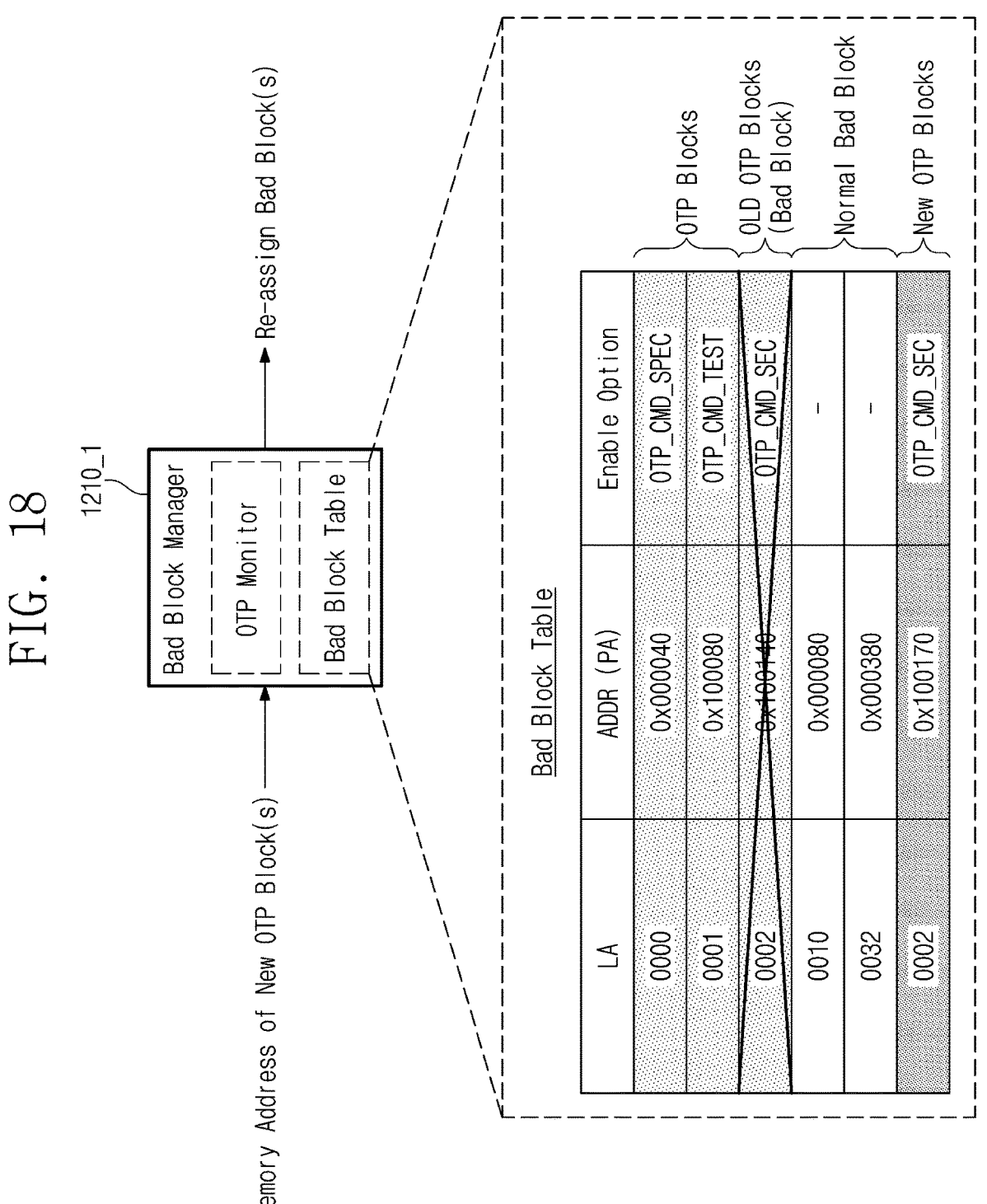

FIGS. 17 and 18 are diagrams illustrating an example of an updated OTP mapping table and an updated bad block table according to an embodiment of the present disclosure. For convenience of description, it is assumed that the OTP mapping table and the bad block table of FIGS. 7 and 8 are updated. Also, it is assumed that there a the probability that a defect occurs in the OTP block corresponding to the i-th user block User BLK i of the first mat MAT1.

Referring to FIG. 17, when there is the probability that a defect occurs in the OTP block corresponding to the i-th user block User BLK i, a user block, from which a defect is absent or in which the number of error bits is equal to or less than the reference value, from among the user blocks may be assigned as a new OTP block. For example, as illustrated in FIG. 17, the r-th user block USER BLK r of the second mat MAT2 may be assigned as a new OTP block.

In this case, special data present in the OTP block corresponding to the i-th user block User BLK i may be read through the page buffer Page Buffer 1, and the read data may be again stored in the new OTP block corresponding to the r-th user block USER BLK r through the page buffer Page Buffer 2.

Afterwards, the OTP mapping table stored in the address register 1160 may be updated to include information about the new OTP block, and information of the old OTP block may be deleted.

Referring to FIG. 18, the bad block manager 1210_1 may receive enable option information and memory address information about the new OTP block and may update the bad block table by using the received information. In this case, as illustrated in FIG. 18, the enable option information, the logical address LA, and the physical address PA corresponding to the new OTP block may be added to the bad block table. The information about the old OTP block may be deleted or may be managed as a normal bad block.

As described above, when there is a probability that a defect occurs in the OTP block, the data storage device 1000B according to an embodiment of the present disclosure may re-assign a new OTP block from the user blocks and may update the OTP mapping table and the bad block table. Accordingly, the special data stored in the OTP block may be protected more stably.

Data Storage Device not Including Bad Block Table

Figure 19:
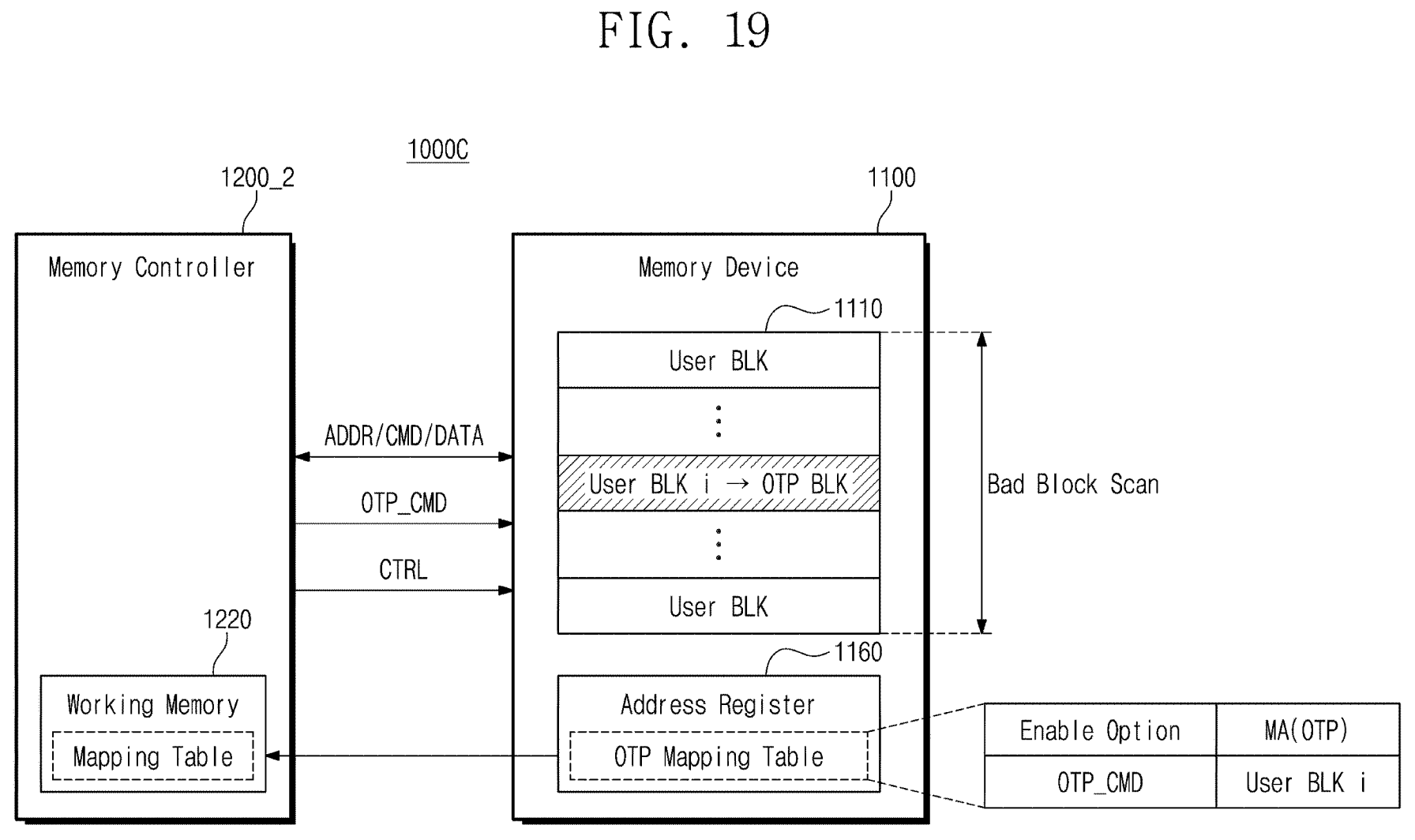

FIG. 19 is a block diagram illustrating a data storage device 1000C according to an embodiment of the present disclosure. The data storage device 1000C of FIG. 19 is similar to the data storage device 1000A of FIG. 1. Accordingly, a similar component may be marked using similar reference numerals/signs, and additional description associated with the similar components will be omitted to avoid redundancy.

The data storage device 1000C according to an embodiment of the present disclosure does not include the bad block manager 1210 and the bad block table. Instead of the bad block table, the data storage device 1000C may integrally manage the user blocks, the normal bad blocks, and the OTP block through a mapping table stored in a working memory 1220.

Referring to FIG. 19, in an operation of the data storage device 1000C, the memory device 1100 scans bad blocks of the memory device 1100 and transmits information about the bad blocks to a memory controller 1200_2. Also, the memory device 1100 transmits information about the user block assigned as the OTP block, which is stored in the address register 1160 of the memory device 1100, to the memory controller 1200_2.

The memory controller 1200_2 may receive the information about the bad blocks and the information about the user block assigned as the OTP block and may organize the mapping table by using the received information. The mapping table may be stored, for example, in the working memory 1220.

FIG. 20 is a diagram illustrating an example of a mapping table stored in the working memory 1220 of FIG. 19.

Referring to FIG. 20, the mapping table integrally manages the user blocks, the normal bad blocks, and the OTP blocks. A state mark may be indicated by "invalid" in the normal bad blocks and the OTP blocks. Also, information about the enable option may be additionally included with regard to the OTP blocks.

When the erase request or the program request for the OTP block is received from the host, the memory controller 1200_2 may determine that the erase- or program-requested block is invalid, with reference to the state mark. In this case, the memory controller 1200_2 may reply that the erase- or program-requested block is a bad block, to the host.

When the read request for the OTP block is received from the host, the memory controller 1200_2 may check the enable option information additionally. When an OTP command signal satisfying the enable option is not received, the memory controller 1200_2 may notify the host that an access-requested block is a bad block. When an OTP command signal satisfying the enable option is received, the memory controller 1200_2 may transmit the OTP command signal satisfying the enable option to the memory device 1100.

As a result, access to the user block assigned as the OTP block may be prevented except for the read request satisfying the enable option. Thus, special data stored in the OTP block may be stably protected.

Memory Package where OTP Block is Randomly Disposed

Figure 21A:
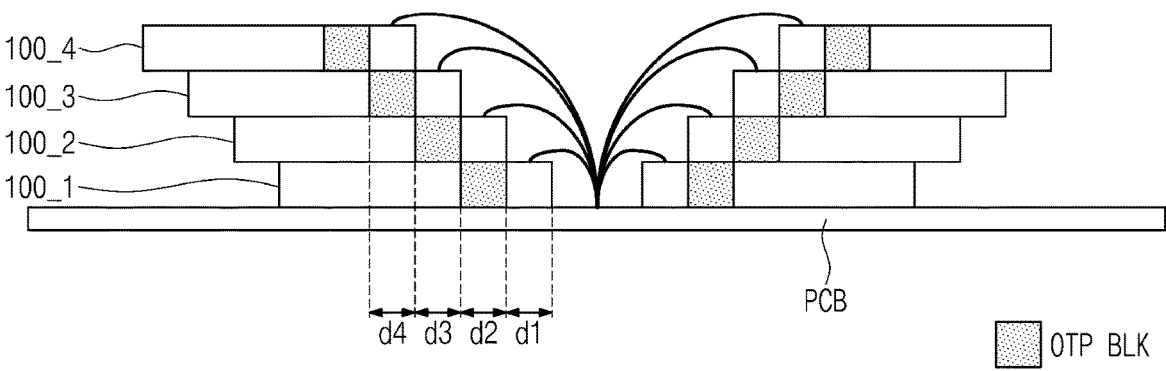
FIG. 21A is a diagram illustrating a memory package.
Figure 21B:
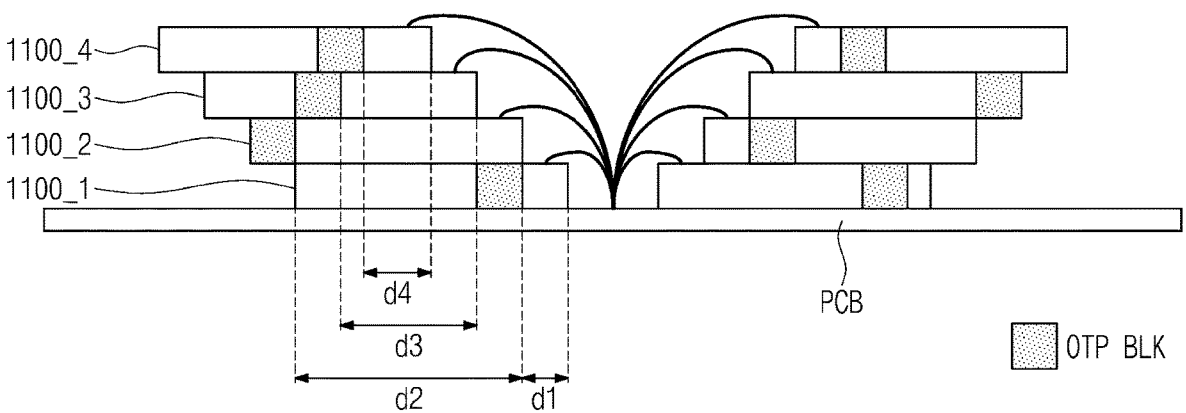
FIG. 21B is a diagram illustrating an example of a memory package according to an embodiment of the present disclosure.

FIG. 21 illustrates diagrams for describing a memory package including memory devices according to an embodiment of the present disclosure. In detail, FIG. 21A is a diagram illustrating a memory package according to a comparative embodiment, and FIG. 21B is a diagram illustrating an example of a memory package according to an embodiment of the present disclosure.

Referring to FIGS. 21A and 21B, memory devices may be stacked on a printed circuit board PCB and may be connected with a printed circuit board PCB through wires. As illustrated in FIGS. 21A and 21B, the memory devices may be stepwise stacked, but the present disclosure is not limited thereto.

In the case of a conventional memory device, the OTP block is assigned in a fixed area of a memory cell array. Accordingly, in the case where a memory package is composed of a plurality of memory devices, the OTP blocks may be regularly disposed in the memory package. For example, referring to FIG. 21A, memory devices 100_1 to 100_4 may have the same horizontal distances d1, d2, d3, and d4, each of which corresponds to a distance from one side surface of each memory device to the OTP block thereof.

In contrast, in the case of a memory device according to an embodiment of the present disclosure, the OTP blocks are randomly disposed in the memory cell array. That is, a physical location of the OTP block in the memory cell array is differently determined for each memory device. Accordingly, in the case where a memory package is composed of a plurality of memory devices, the OTP blocks of the memory devices may be disposed at different physical locations.

For example, referring to FIG. 21B, it is assumed that a horizontal distance from one side surface of a first memory device 1100_1 to the OTP block thereof is "d1", a horizontal distance from one side surface of a second memory device 1100_2 to the OTP block thereof is "d2", a horizontal distance from one side surface of a third memory device 1100_3 to the OTP block thereof is "d3", and a horizontal distance from one side surface of a fourth memory device 1100_4 to the OTP block thereof is "d4". In this case, at least two of the horizontal distances d1, d2, d3, and d4 may be different from each other.

While the above provides detailed embodiments for carrying out the invention, the present disclosure is not limited thereto. For example, in FIGS. 1 to 11, the description indicates the special data is stored in an E-Fuse manner and are read. However, this is an example, and the special data may be stored in the OTP block in a normal data storing manner. In this case, the data storage device of FIG. 1 need not include a fuse block.

A memory device according to at least one embodiment of the present disclosure may efficiently use a data storage space and may stably protect data stored in the OTP block.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operation method of a memory device, the method comprising:
   storing data, unassociated with a value indicating a defective block, in a non-defective block, wherein the non-defective block is registered in a bad block table and managed as a bad block despite being defect-free;
   receiving, from a host, a normal read command for the non-defective block; and
   replying to the host with a fail signal in response to the normal read command.

2. The operation method of claim 1, further comprising:
   performing a read operation for the non-defective block when a special read command for the non-defective block is received from the host.

3. The operation method of claim 2, further comprising:
   storing an address corresponding to the non-defective block and the special read command in an address register of the memory device.

4. The operation method of claim 2, wherein the special read command is an enable option for accessing the non-defective block.

5. The operation method of claim 1, wherein the data stored in the non-defective block is at least one of secure data, characteristic data or product specification data.

6. The operation method of claim 1, further comprising:
   selecting the non-defective block, in which a number of error bits is equal to or less than a reference value, from among a plurality of non-defective blocks.

7. An operation method of a data storage device, the method comprising:
   storing data, unassociated with a value indicating a defective block, in a non-defective block among a plurality of non-defective blocks; and
   marking a location corresponding to the non-defective block in a bad block table so that the non-defective block is managed as a bad block despite being defect-free.

8. The operation method of claim 7, further comprising:
   replying to a host with a fail signal when a normal read command for the non-defective block is received from the host.

9. The operation method of claim 8, further comprising:
   performing read operation for the non-defective block when a special read command for the non-defective block is received from the host.

10. The operation method of claim 9, further comprising:
    storing an address corresponding to the non-defective block and the special read command in an address register.

11. The operation method of claim 9, wherein the special read command is an enable option for accessing the non-defective block.

12. The operation method of claim 7, wherein the data stored in the non-defective block is at least one of secure data, characteristic data or product specification data.

13. The method of claim 7, further comprising:

selecting the non-defective block, in which a number of error bits is equal to or less than a reference value, from among the plurality of non-defective blocks.

14. A memory device comprising:

a memory cell array comprising a plurality of non-defective blocks; and an address register configured to store a location corresponding to a selected non-defective block among the plurality of non-defective blocks, wherein data stored in the selected non-defective block is unassociated with a value indicating a defective block, and wherein the location corresponding to the selected non-defective block is recorded in a bad block table and managed as a bad block despite the block being defect-free.

15. The memory device of claim 14, wherein a fail signal is transmitted to a host when a normal read command for the selected non-defective block is received from the host.

16. The memory device of claim 15, wherein a read operation for the selected non-defective block is processed when a special read command for the selected non-defective block is received from the host.

17. The memory device of claim 16, wherein the special read command is an enable option for accessing the selected non-defective block.

18. The memory device of claim 14, wherein the data stored in the selected non-defective block is at least one of secure data, characteristic data or product specification data.

19. The memory device of claim 14, wherein the selected non-defective block is a non-defective block selected from the plurality of non-defective blocks in which a number of error bits is equal to or less than a reference value.

20. The memory device of claim 14, wherein the selected non-defective block is randomly disposed in the memory cell array.

\* \* \* \* \*